United States Patent
Lee et al.

(10) Patent No.: US 10,703,858 B2
(45) Date of Patent: Jul. 7, 2020

(54) BLOCK COPOLYMER MATERIALS CONTAINING POLYHEDRAL OLIGOMERIC SILSESQUIOXANE(POSS)

(71) Applicant: GWANGJU INSTITUTE OF SCIENCE AND TECHNOLOGY, Gwangju (KR)

(72) Inventors: Jae Suk Lee, Gwangju (KR); Chang Geun Chae, Gwangju (KR); Mallela Yadagiri Lakshmi Narasimha Kishore, Gwangju (KR); Myung Jin Kim, Gwangju (KR); In Gyu Bak, Gwangju (KR); Ho Bin Seo, Gwangju (KR); Yong Guen Yu, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 18 days.

(21) Appl. No.: 16/133,280

(22) Filed: Sep. 17, 2018

(65) Prior Publication Data

US 2019/0085118 A1    Mar. 21, 2019

Related U.S. Application Data

(60) Provisional application No. 62/558,880, filed on Sep. 15, 2017.

(30) Foreign Application Priority Data

Sep. 17, 2018 (KR) .................. 10-2018-0111136

(51) Int. Cl.
  *C08G 61/08* (2006.01)
  *C08G 81/00* (2006.01)
  *C08L 87/00* (2006.01)

(52) U.S. Cl.
  CPC ............. *C08G 61/08* (2013.01); *C08G 81/00* (2013.01); *C08L 87/005* (2013.01); *C08G 2261/126* (2013.01); *C08G 2261/144* (2013.01); *C08G 2261/1428* (2013.01); *C08G 2261/1432* (2013.01); *C08G 2261/228* (2013.01); *C08G 2261/3324* (2013.01); *C08G 2261/75* (2013.01)

(58) Field of Classification Search
  CPC ............................................ C08G 2261/3324
  See application file for complete search history.

(56) References Cited

PUBLICATIONS

Lee et al., Experimental Formulation of Photonic Crystal Properties for Hierarchically Self-Assembled POSS-Bottlebrush Block Copolymers, School of Materials Science and Engineering and Grubbs Center for Polymers and Catalysis, , Macromolecules 51(9), 3458-3466 (Apr. 2018).*

Xu et al., Synthesis of novel block copolymers containing polyhedral oligomeric silsesquioxane (POSS) pendent groups via ring-opening metathesis polymerization (ROMP), Polymer 48 (2007) 6286-6293, Aug. 9, 2007.*

* cited by examiner

*Primary Examiner* — Jeffrey C Mullis
(74) *Attorney, Agent, or Firm* — Hauptman Ham, LLP

(57) ABSTRACT

A macromolecular photonic crystal material including an A block and a B block is disclosed.
the A block comprises a crystalline polyhedral oligomeric POSS, the macromolecular photonic crystal material represented by the structural formula 1.

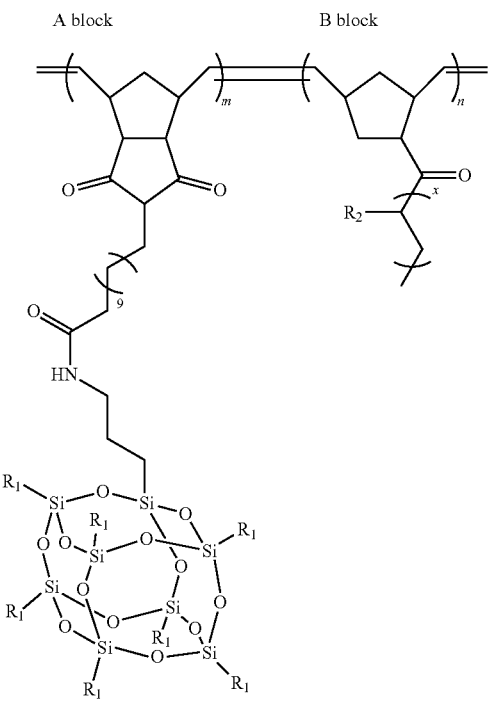

[formula 1.]

2 Claims, 16 Drawing Sheets

Monomer: MW / spacer length / functional group
M1: 1021 Da / 3-atom chain / none
M2: 1064 Da / 6-atom chain / secondary amine
M3: 1218 Da / 16-atom chain / amide

[M3]$_0$/[I]$_0$ = 50

15 s / 30 s / 60 s /
120 s / 240 s

[M3]$_0$/[I]$_0$ = 100

15 s / 30 s / 60 s /
120 s / 240 s

[M3]$_0$/[I]$_0$ = 250

15 s / 30 s / 60 s /
120 s / 240 s

[M3]$_0$/[I]$_0$ = 500

15 s / 30 s / 60 s
120 s / 240 s / 480 s

[M3]$_0$/[I]$_0$ = 1,000

15 s / 30 s / 60 s /
120 s / 240 s / 480 s

Elution time (min)

- P1 ($T_{d,5wt\%}$ = 431 °C)
- P2 ($T_{d,5wt\%}$ = 385 °C)
- P3 ($T_{d,5wt\%}$ = 419 °C)

US 10,703,858 B2

BLOCK COPOLYMER MATERIALS CONTAINING POLYHEDRAL OLIGOMERIC SILSESQUIOXANE(POSS)

CROSS-REFERENCE TO RELATED APPLICATIONS

This application claims the priority of U.S. Provisional Patent Application No. 62/558,880 filed on Sep. 15, 2017; Korean Patent Application No. 10-2018-0111136 filed on Sep. 17, 2018 in the Korean Intellectual Property Office, the disclosure of which is hereby incorporated by reference in its entirety.

BACKGROUND

1. Field of the Invention

Discloses a macromolecular polymer photonic crystal material containing polyhedral oligomeric silsesquioxane (POSS).

2. Description of the Related Art

Block copolymers are widely used as organic polymer photonic crystal materials. Brush block copolymers through polymerization of double norbornene macromonomers have commercial disadvantages as they require precise polymerization techniques.

SUMMARY OF THE INVENTION

Cube-like polyhedral oligomeric silsesquioxane (POSS) is a promising candidate of isotropically bulky pendants to expand the dimensional limit of polymer main chains. This paper presents molecular and kinetic insights into the controlled synthesis of rod-like POSS-containing polynorbornenes. Ring-opening metathesis polymerization (ROMP) was performed on three norbornene-substituted POSS monomers with different spacers. For monomers possessing non- and amide functionalities at the spacers, ROMP at the maximum concentration ($[M]_0$=0.4 M) led to 100% conversion, predictable molecular weights ($M_n \leq 1236$ kDa) and low dispersities ($Đ \leq 1.20$) in homopolymers. Scaling analysis for POSS-containing polynorbornenes revealed an unusual finding, namely, that the periodic clustering of POSS pendants favored by long flexible spacers (16-atom chains) enhanced the rigidity of polynorbornene main chains, leading to their rod-like conformation. Kinetically optimized ROMP allowed the subsequent addition of a macromonomer to create POSS-bottlebrush copolymers (POSSBBCPs). These POSSBBCPs self-assembled into thin films to form ordered nanostructures with diverse morphologies and periodicities greater than 100 nm.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

D=1.20) recorded at a heating rate of 10° C./min under a nitrogen atmosphere. Temperatures for 5 wt % loss were indicated as $T_{d,5\ wt\ \%}$ (S13).

Figure 27A:
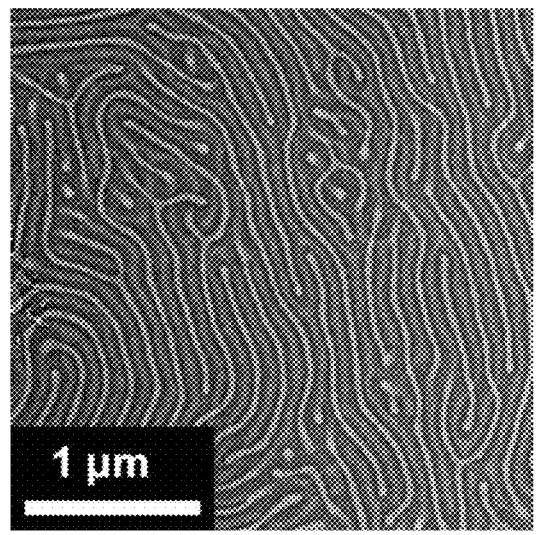
Figure 27B:
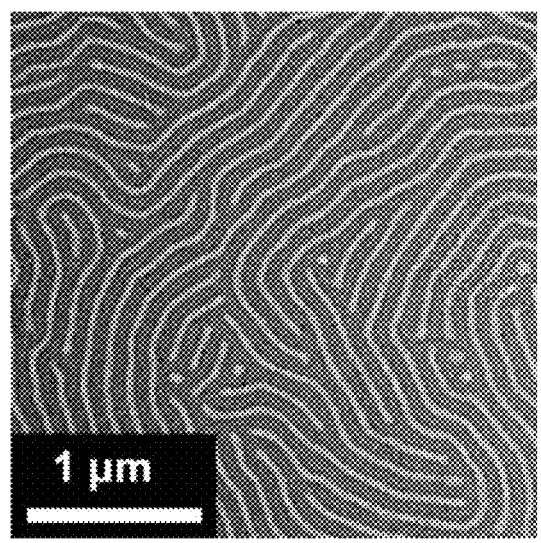

FIGS. 27A and 27B include (A) TEM micrographs of thin films of self-assembled P3-b-P(NB-g-BzMA) with $f_A$=67 wt % ($M_n$=890 kDa; Đ=1.07) displaying (A) a bilayer and (B) a monolayer of P(NB-g-BzMA) cylinders (S14).

DETAILED DESCRIPTION OF THE INVENTION

In a macromolecular photonic crystal material including an A block and a B block, Wherein the A block comprises a crystalline polyhedral oligomeric POSS, The macromolecular photonic crystal material represented by the structural formula 1.

[formula 1.]

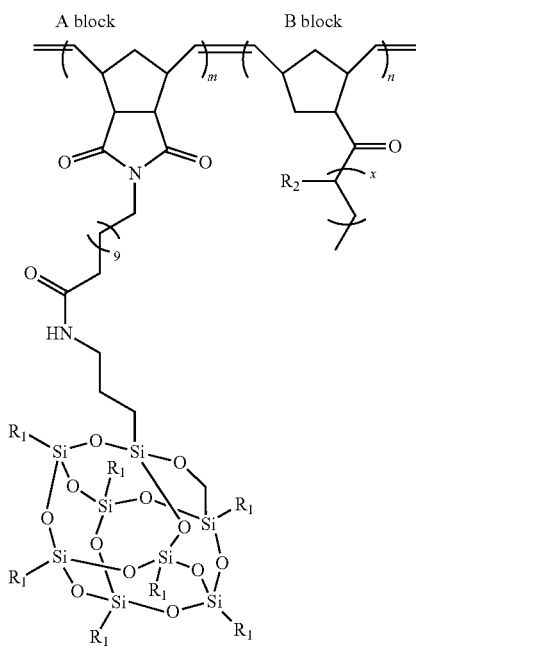

The evolution of a Gaussian coil to an extended rod in a polymer by enhancing its main chain rigidity is considered an efficient way to break the conventional dimensional limits of polymer chains. Rod-like block copolymers (BCPs) with high molecular weights (MW>1000 kDa) have attracted considerable interest due to their convertibility to nanostructured materials with large periodicities greater than 100 nm, such as photonic crystals. The polymers are mostly brush and dendronized polymers which possess highly extended main chains attributed to the steric repulsion of crowded bulky side groups. Ring-opening metathesis polymerization (ROMP) of macromonomers has been established as a "grafting through" method to produce such polymers. Recently, our previous study demonstrated that the use of macromonomers precisely prepared by anionic polymerization can offer predictable molecular weights (MWs)/degrees of polymerization (DPs) and low dispersities to brush polymers.

In the grafting through synthesis of brush or dendronized polymers, MWs of macromonomers induce two conflicting effects on the main chain dimension. More massive side groups generally improve the main chain rigidity more, extending the main chain dimension. However, those also depress the reactivity of the propagating active center by more intensively barricading the active chain ends making it difficult to access to higher main chain DPs. For this reason, the MWs of macromonomers should be adequate to compromise the main chain rigidity and main-chain DPs. To extend the dimensional scope of main chain. It is encouraged to seek an effective molecular structure of monomer that can impose a great steric effect with less massive side groups.

One alternative bulky molecule is polyhedral oligomeric silsesquioxane (POSS, $(RSiO_{1.5})_8$), isotropic material composed of a cube-like inorganic nanocage and eight organic corner groups. The incorporation of POSS units into linear polymers has been approached by the polymerization of vinyl-substituted POSS monomers. However, most methods have been challenging in terms of yield of POSS-containing polymers with high MWs and low dispersities due to their kinetic problems. The anionic polymerization at low solution concentration and low temperature makes it difficult to increase the homopolymer DPs above ~100. Reversible deactivation radical polymerizations (RDRP) such as atom transfer radical polymerization (ATRP) and reversible addition-fragmentation chain transfer polymerization (RAFT) provide favorable reaction conditions. However, the chain growth of active centers retarded by steric barriers causes chain transfer, resulting in high dispersities of high-MW polymers. This steric hindrance mainly arises from too short statistical segmental lengths, making vinyl polymers shorter (0.25 nm for ideal all-trans conformation[1]).

ROMP is an alternative to solve this limitation. (1) Favorable reaction conditions for a high polymer DP (high solution concentration and mild temperature), (2) high metathesis activity and (3) long statistical segmental lengths for polynorbornenes (0.46-0.51 nm), were expected to kinetically diminish the steric factors during propagation. Although several efforts have been made toward the ROMP of norbornene-substituted POSS monomers, Our recent study achieved the synthesis of POSS-containing polynorbornenes with high MWs toward access to highly ordered photonic crystals. However, the desirable monomer structure and polymerization kinetics for such polymers to attain precise control over a wide range of MWs retaining the rod-like dynamics of main chains have not been fully comprehended until now.

In this paper, we report the rational molecular and kinetic design for the controlled ROMP of norbornene-substituted POSS monomers. The present work aims to identify crucial requirements to accomplish the synthesis of rod-like POSS-containing polynorbornenes with high MWs and low dispersities. We explored the ROMP of three norbornene-substituted POSS monomers with different spacers that can alter the kinetics of ROMP and main chain conformation of polymers. The livingness of ROMP for each monomer was compared through kinetic analysis, and the manipulation of initial monomer concentration was performed to change the propagation rate. Dimensional scaling behaviors and physical properties for resulting polymers were analyzed to confirm the effect of spacer length on the main chain conformation. After the establishment of optimal conditions toward the controlled homopolymerization, the synthesis of POSS-bottlebrush BCPs (POSSBBCPs), which contains POSS pendants and polymeric grafts, were attempted through the sequential ROMP with a macromonomers to compare the effects of two types of side chains on the main chain dimension in the self-assembled thin films.

Results and Discussion

Monomer design and homopolymerization procedure. We prepared three types of norbornene-substituted POSS monomers with different spacers, 3-(5-norbornene-exo-2,3-dicarboximido)propyl-heptaisobutyl POSS (M1: MW=1021 Da), 3-(2-(5-norbornene-exo-2,3-dicarboximido)ethylamino)propyl-heptaisobutyl POSS (M2: MW=1064 Da), 3-(12-(5-norbornene-exo-2,3-dicarboximido)dodecanoylamino)propyl-heptaisobutyl POSS (M3: MW=1218 Da). M1, M2 and M3 have 3-, 6- and 16-atom-chain spacers, respectively, between norbornene-dicarboximide and heptaisobutyl POSS. These monomers also have distinguishable functional groups. While the spacer of M1 is entirely composed of a hydrocarbon, the spacers of M2 and M3 contains a secondary amine and an amide, respectively. The MWs of the pure spacers are as low as 42/85/239 Da for M1/M2/M3. Thus, we assumed that the effect of spacer's bulkiness on the main chain rigidity is not significant. The ROMP of M1, M2 and M3 was performed using $RuCl_2(pyridine)_2(H_2IMes)(CHPh)$ (Ru) as an initiator in THF at 25° C., varying the feed ratio of monomer to initiator ($[M]_0/[I]_0$) across values of 50, 100, 250, 500, and 1000 to generate poly[3-(5-norbornene-exo-2,3-dicarboximido)propyl-heptaisobutyl POSS] (P1), poly[3-(12-(5-norbornene-exo-2,3-dicarboximido)dodecanoylamino)propyl-heptaisobutyl POSS] (P2) and poly[3-(12-(5-norbornene-exo-2,3-dicarboximido)dodecanoylamino)propyl-heptaisobutyl POSS] (P3) (Scheme 1). The synthesis and ROMP of M3 have been described in our previous report.

ROMP of norbornene-substituted POSS monomers. Initial tasks were to investigate the livingness of ROMP for norbornene-substituted POSS monomers. Kinetic analysis for the ROMP was conducted at an initial molar concentration of monomer, $[M]_0=0.1$ M. Aliquots were extracted from homopolymerization mixtures at particular time t and quenched by adding ethyl vinyl ether. Number-average MW ($M_n$), weight-average MW ($M_w$) and dispersity ($Đ=M_w/M_n$) of polymer at t were measured using size exclusion chromatography-multiangle laser light scattering (SEC-MALLS). Monomer conversion (conv) at t was determined from the comparison of polymers and remaining monomers in the SEC-differential reflective index (dRI) trace. The Mn at each conv was compared to the theoretical value ($M_{n,theo}$)

Figure 1:
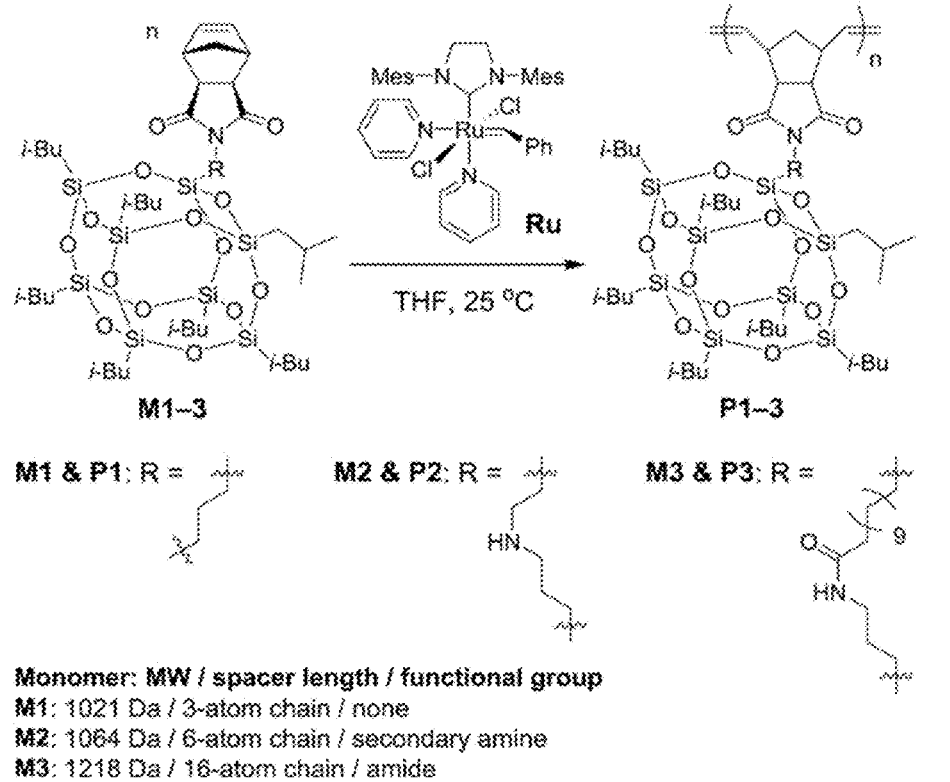
FIG. 1 shows ROMP of norbornene-substituted POSS monomers, M1, M2 and M3, initiated by $RuCl_2$(pyridine)$_2$ ($H_2$IMes)(CHPh) (Ru) in THF at 25° C. (Scheme 1).
Figure 2A:
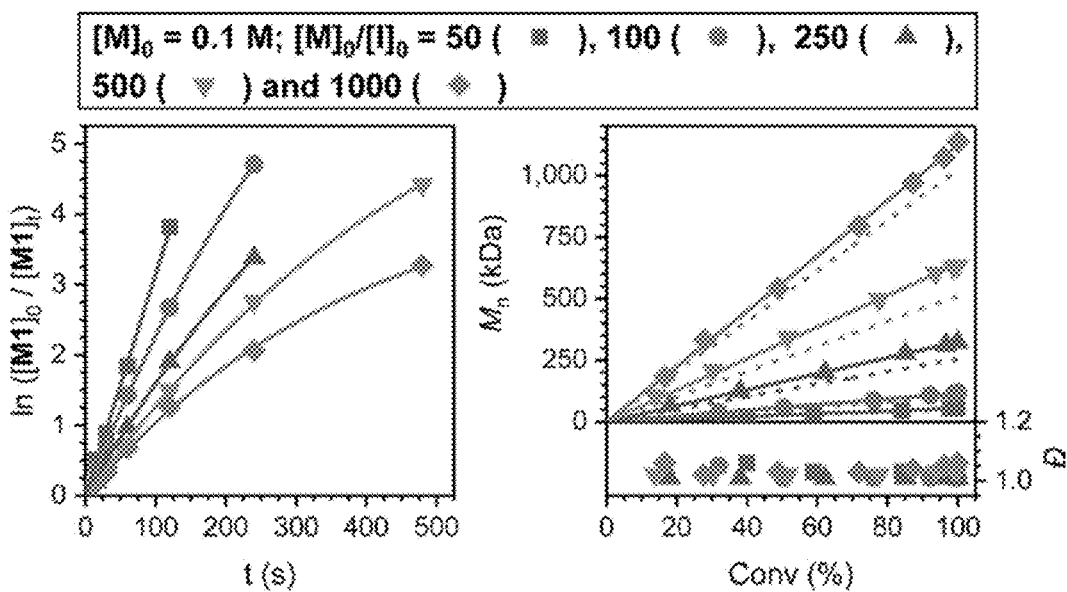
FIGS. 2A, 2B, and 2C include Kinetics profiles of ROMP of (A) M1, (B) M2 and (C) M3 (M) initiated by Ru (I) in THF at 25° C. ($[M]_0$=0.1 M): (left column) Plots of $\ln([M]_0/[M]_t)$ versus t and (right column) plots of Mn and Đ versus conv (linear fits of $M_{n,theo}$ against conv are displayed as dash lines).

The kinetic profiles on ROMP in $[M]_0=0.1$ M revealed the non-living natures of all three types of propagating species (P1*, P2*, and P3* corresponding to monomers M1, M2, and M3, respectively) (FIG. 2). For the ROMP of M1, instantaneous $[P1*]_t$ gradually decreased over time in the $[M1]_0/[I]_0$ range of 100-1000 (FIG. 2A, left column), although side reactions were not observed (FIG. 2A, right column). Since the slowing of conversion was not immediate at the early stage and continued throughout the propagation, a possibility of termination by impurities in the monomer was excluded. Alternatively, we considered that the bulky POSS pendants closely crowded at the propagating chain ends by spacers that were too short and would make a part of the propagating species temporarily dormant.

Figure 2B:
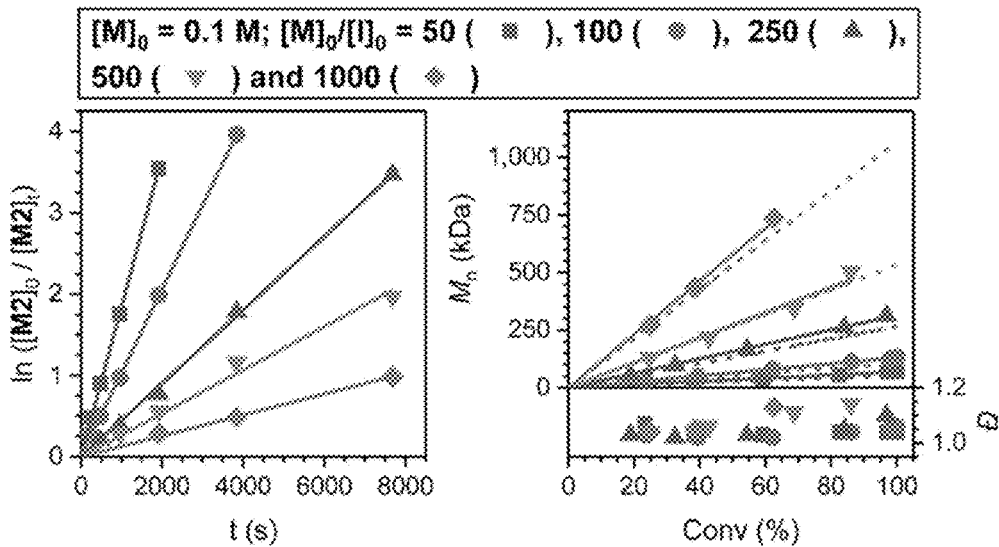

The steric reason disappeared for longer spacers. In the ROMP of M2, no reduction of $[P2*]_t$ occurred within 2 h, but the propagation substantially slowed. In addition, the propagation unexpectedly ceased after 2 h, resulting in relatively low convs in the $[M2]_0/[I]_0$ range of 250-1000 (FIG. 2B). The deactivated metathesis was attributed to the coordination of the secondary amine to the ruthenium center and the subsequent decomposition of carbene. The related pathways have been intensively discussed in previous studies on the amine-mediated decomposition of ruthenium catalyst.

Figure 2C:
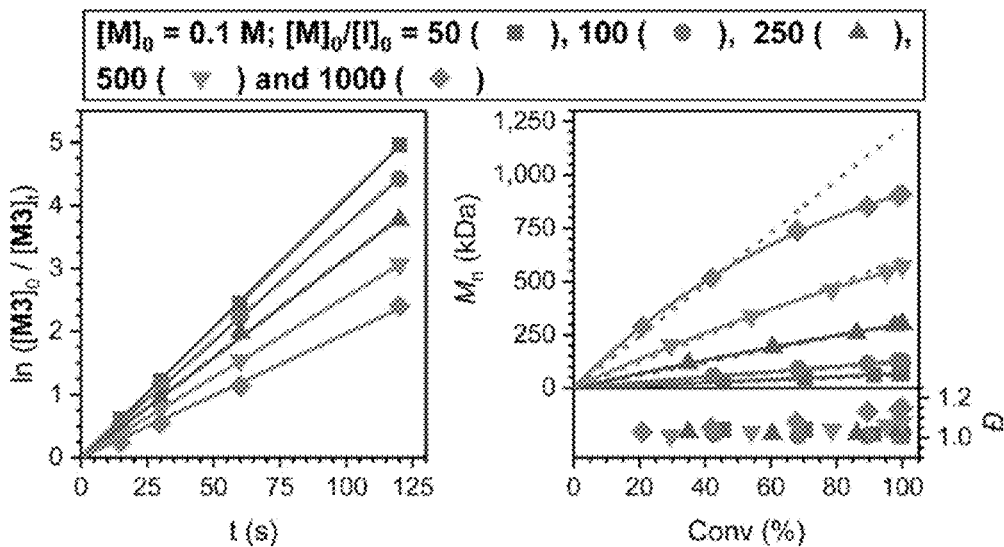

In the ROMP of M3, no reduction of instantaneous $[P2*]_t$ was observed in the $[M3]_0/[I]_0$ range of 50-1000, indicating that the steric barricading of POSS pendants at the propagation chain ends was relieved by long flexible spacers (FIG. 2C, left column). However, the increase of Mn gradually slowed down with the increase of conv, especially at $[M3]_0/[I]_0=1000$, resulting in the $M_n$ of P3* lower than the $M_{n,theo}$ (FIG. 2C, right column). This problem might be attributed to a type of intramolecular chain transfer such as backbiting. Unfortunately, we failed to identify the presence of cyclic polymers. The reason for the occurrence of this problem only in P3* is also still vague. However, we assume that the chain end of P3* might be less sterically hindered by long flexible spacers compared to those of P1* and P2* and thus the active center might be slightly more prone to contact a polynorbornene segment adjacent to the chain end.

Effect of high concentration on ROMP. The results of the homopolymerization of M1-3 in $[M]_0=0.1$ M at final conversion are summarized in Table 1. As revealed in the kinetic profiles, the controlled ROMP in $[M]_0=0.1$ M was interrupted by side kinetic factors: steric hindrance at propagating chain ends for P1*, amine-mediated decomposition for P2*, and intramolecular chain transfer for P3*.

In 1993, Matyjaszewski has presented a reliable criterion to rank the livingness of polymerization system according to the ratio of the rate constant of unimolecular chain transfer to that of propagation ($k_{tr}/k_p$). Six classes are defined, where class n (n=1, 2, 3, 4, 5 and 6) corresponds to the $k_{tr}/k_p$ value within $10^{-n}$-$10^{-(n+1)}$ mol L$^{-1}$. Higher class indicates higher livingness of polymerization system. Rearrangement of Matyjaszewski's equation offers the $k_{tr}/k_p$ value as a function of DP:

$$k_{tr}/k_p = \frac{([M]_0-[M]_t)/DP - [I]_0}{\ln([M]_0/[M]_t)} \quad (1)$$

This equation is applicable to the unimolecular chain transfer with a chain-breaking process.

Therefore, we could calculate $k_{tr}/k_p$ values for the ROMP of M3. The $k_{tr}/k_p$ values at convs within 95-99% for $[M3]_0/[I]_0=250/500/1000$ were found to be 1.18/4.32/7.46× $10^{-6}$ mol L$^{-1}$ corresponding to the livingness of class 5 (the values for $[M3]_0/[I]_0=50/100$ were not obtained). In fact, class 5 is not sufficient to precisely control the DP up to ~1000. Interestingly, $k_p/k_{tr}$ tended to gradually increase with the decrease of $[I]_0$. This implies that a more concentrated polymerization solution is required to improve MW control.

We expected that increasing the initial monomer concentration can effectively reduce the competition between propagation and side kinetic factors. The similar strategy has been attempted in the polymerization of sterically bulky monomers to facilitate the propagation overcoming the steric hindrance. Accordingly, the ROMP of M1-3 was performed in $[M]_0=0.4$ M as the maximum concentration to improve the controllability of ROMP even at high $[M]_0/[I]_0$ of 1000.

TABLE 1

ROMP of M1-3 (M) initiated by Ru (I) in THF at 25° C. ([M]$_0$ = 0.1M)

| Entry | M  | [M]$_0$/[I]$_0$ | Conv[a] (%) | M$_{n, theo}$[b] (kDa) | M$_n$[a] (kDa) | Đ[a] |
|---|---|---|---|---|---|---|
| 1 | M1 | 50   | 100  | 51   | 55   | 1.02 |
| 2 | M1 | 100  | 100  | 102  | 118  | 1.01 |
| 3 | M1 | 250  | 100  | 255  | 324  | 1.01 |
| 4 | M1 | 500  | 100  | 510  | 634  | 1.04 |
| 5 | M1 | 1000 | 100  | 1020 | 1138 | 1.06 |
| 6 | M2 | 50   | 100  | 53   | 71   | 1.04 |
| 7 | M2 | 100  | 100  | 106  | 132  | 1.06 |
| 8 | M2 | 250  | 96.9 | 258  | 312  | 1.10 |
| 9 | M2 | 500  | 86.0 | 457  | 502  | 1.14 |
| 10 | M2 | 1000 | 62.6 | 666 | 736  | 1.13 |
| 11 | M3 | 50   | 100  | 61   | 69   | 1.01 |
| 12 | M3 | 100  | 100  | 122  | 125  | 1.01 |
| 13 | M3 | 250  | 100  | 305  | 302  | 1.04 |
| 14 | M3 | 500  | 100  | 609  | 573  | 1.08 |
| 15 | M3 | 1000 | 100  | 1218 | 910  | 1.15 |

[a] Determined by SEC-MALLS.
[b] M$_{n, theo}$ = [M]$_0$/[I]$_0$ × conv/100% × MW of monomer.

The results of homopolymerization in [M]$_0$=0.4 M at final conversion are summarized in Table 2. Since faster propagation was facilitated by higher [M]$_0$, most cases of the ROMP more rapidly reached 100% conversion of the monomer. For P1 and P3, the MWs and dispersities were very reasonable in the [M]$_0$/[I]$_0$ ranges of 50-1000. For P2, however, uncontrolled MWs and high dispersities were increasingly faced with an increase of [M2]$_0$/[I]$_0$ due to the occurrence of intermolecular chain transfer.

TABLE 2

ROMP of M1-3 (M) initiated by Ru (I) in THF at 25° C. ([M]$_0$ = 0.4M)

| Entry | M  | [M]$_0$/[I]$_0$ | Conv[a] (%) | M$_{n, theo}$[b] (kDa) | M$_n$[a] (kDa) | Đ[a] |
|---|---|---|---|---|---|---|
| 16 | M1 | 50   | 100 | 51   | 54   | 1.02 |
| 17 | M1 | 100  | 100 | 102  | 106  | 1.03 |
| 18 | M1 | 250  | 100 | 255  | 262  | 1.06 |
| 19 | M1 | 500  | 100 | 510  | 512  | 1.06 |
| 20 | M1 | 1000 | 100 | 1020 | 1042 | 1.10 |
| 21 | M2 | 50   | 100 | 53   | 61   | 1.12 |
| 22 | M2 | 100  | 100 | 106  | 127  | 1.23 |
| 23 | M2 | 250  | 100 | 266  | 658  | 1.90 |
| 24 | M2 | 500  | 100 | 532  | [c]  | [c]  |
| 25 | M2 | 1000 | 100 | 1064 | [c]  | [c]  |
| 26 | M3 | 50   | 100 | 61   | 67   | 1.02 |
| 27 | M3 | 100  | 100 | 122  | 124  | 1.02 |
| 28 | M3 | 250  | 100 | 305  | 310  | 1.07 |
| 29 | M3 | 500  | 100 | 609  | 626  | 1.12 |
| 30 | M3 | 1000 | 100 | 1218 | 1236 | 1.20 |

[a] Determined by SEC-MALLS.
[b] M$_{n, theo}$ = [M]$_0$/[I]$_0$ × conv/100% × MW of monomer.
[c] Unable to be determined due to the formation of insoluble gels.

Figure 3:
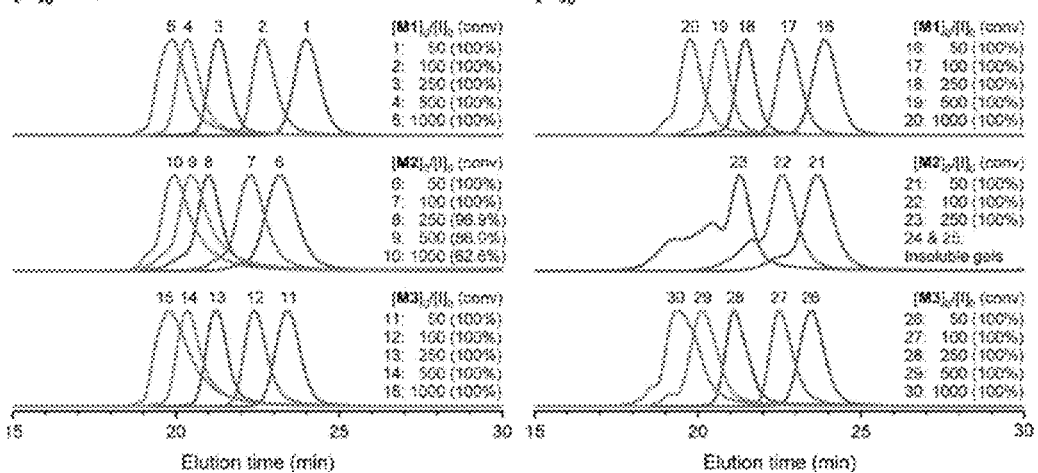
FIG. 3 shows SEC-dRI traces of final POSS-containing polynorbornenes yielded by ROMP in (a-c) $[M]_0$=0.1 M and (d-f) $[M]_0$=0.4 M. Polymer type: (a,d) P1, (b,e) P2, and (c,f) P3.

To identify the effect of high concentration on the MW control of ROMP, comparative analyses of SEC traces, Mn and Đ were performed for the final P1-3 homopolymers yielded in [M]$_0$=0.1 and 0.4 M. The SEC traces of the final P1 and P3 homopolymers revealed that [M]$_0$=0.4 M offered a better shift to higher MWs with the increase of [M]$_0$/[I]$_0$. In particular, the portions of low-MW tails that might be dead chains were significantly reduced by increasing [M]$_0$ from 0.1 M to 0.4 M (FIG. 3a,c,d,f). These results indicated that the propagation dominated over the side processes at high [M]$_0$. Although [M]$_0$=0.4 M also increased the chance of intermolecular chain transfer to yield high-MW byproducts, the proportions of those contents was low. Above all, preventing the dead chains is essential to maximize the probability of uniform chain growth in the block copolymerization. SEC-dRI traces of the final P2 homopolymers showed the MW was hardly controlled in [M2]$_0$=0.4 M due to the occurrence of considerable intermolecular chain transfer of P2* (FIG. 3e). As a result, MW control was possible only for [M2]$_0$=0.1 M in the [M2]$_0$/[I]$_0$ range of 50-250 (FIG. 3b).

Figure 4:
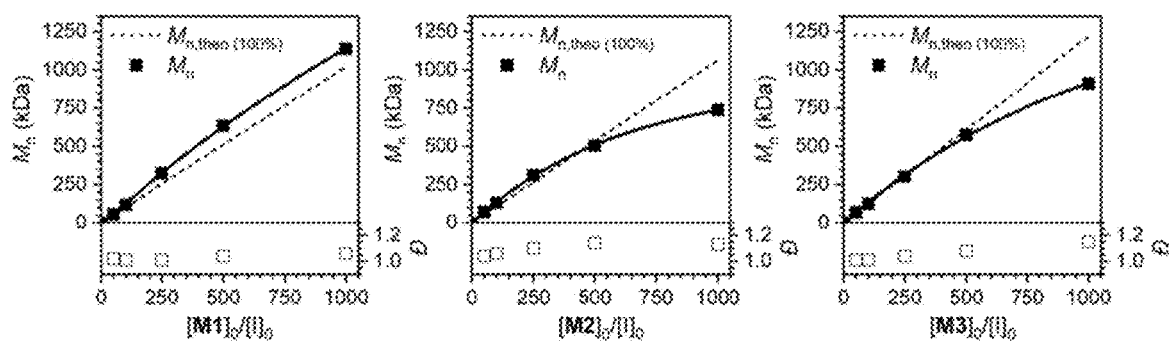
FIG. 4 shows Plots of Mn and Đ versus $[M]_0/[I]_0$ for final POSS-containing polynorbornenes yielded by ROMP in (a-c) $[M]_0$=0.1 M and (d-f) $[M]_0$=0.4 M. Polymer type: (a,d) P1, (b,e) P2, and (c,f) P3.
Figure 4:
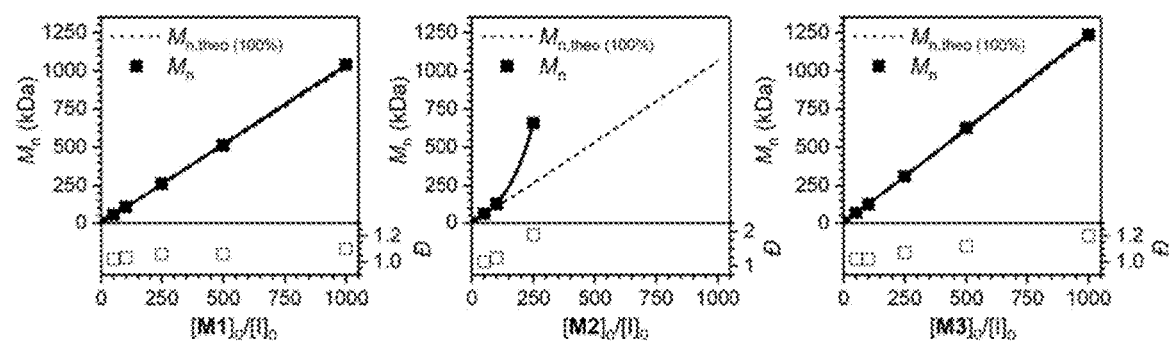

M$_n$ and Đ values of the final P1-3 homopolymers yielded in [M]$_0$=0.1 and 0.4 M were plotted against [M]$_0$/[I]$_0$ (FIG. 4). Most cases of ROMP in [M]$_0$=0.1 M did not show the linear scaling of M$_n$ with [M]$_0$/[I]$_0$ (FIG. 4a-c). However, the ROMP of M1 and M3 performed in [M]$_0$=0.4 M finally achieved the control over MWs in the greatly expanded [M]$_0$/[I]$_0$ range of 50-1000, which was evidenced by (1) the linear increase of M$_n$ in proportion to [M]$_0$/[I]$_0$ (2) M$_n$ values (M$_n$=54-1042 kDa for P1 and 67-1236 kDa for P3) nearly identical to the theoretical values at 100% conversion (M$_{n,theo}$ (100%)=51-1020 kDa for P1 and 61-1218 kDa for P3), and (3) the low dispersities (Đ=1.02-1.10 for P1 and 1.02-1.20 for P3) (FIG. 4d,f).

Effect of spacer length on main chain conformation of POSS-containing polynorbornenes. The main chain conformations of P1-3 homopolymers were predicted through dimensional-scaling analysis. On the basis of Flory's mean field theory, the scaling of the radius of gyration (R$_g$) for a single polymer chain in dilute solution exhibits a power-law function dependent on the DP or MW with the Flory exponent v as R$_g$ ∝ DP$^v$ or MW$^v$.

The value of v is an indicator of the conformation of polymer main chain (0.33 for the ideal globular conformation, 0.33-0.60 for the coil-like conformation, 0.60-1.0 for the rod-like conformation, and 1.0 for the ideal rod conformation).

Figure 5:
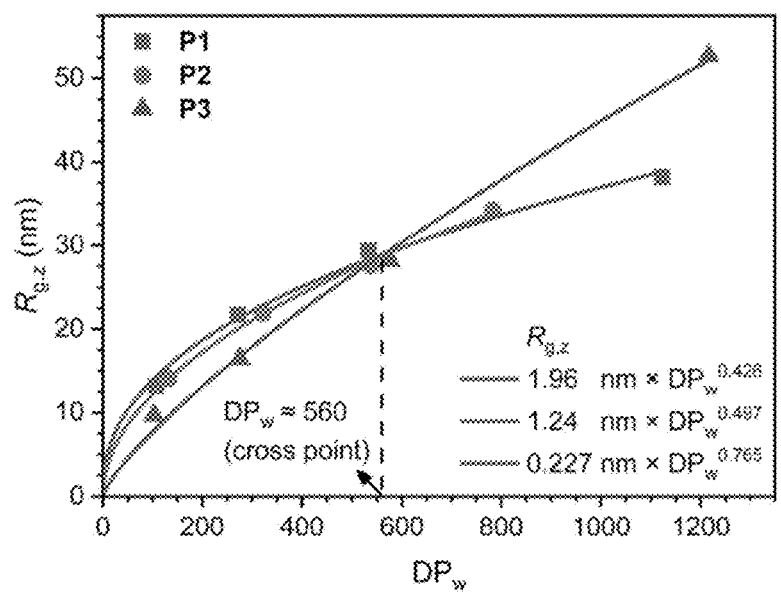
FIG. 5 shows Plots of $R_{g,z}$ versus $DP_w$ for (a) P1 s ($M_n$=106-1042 kDa; Đ=1.03-1.10), (b) P2s ($M_n$=132-736 kDa; Đ=1.06-1.13), and (c) P3 s ($M_n$=124-1236 kDa; Đ=1.02-1.20) in 3.5 mg/mL THF solution.

We measured z-average R$_g$ (R$_{g,z}$) values of P1-3s with Mn ith s kDa and Đ≤1.20 in 3.5 mg/mL THF solutions through SEC-MALLS, and those were fitted to a power-law function of weight-average DP (DP$_w$) with v values as scaling powers (Table S5). Surprisingly, the resulting scaling profiles revealed that the main chain extension was dependent on the spacer length (FIG. 5). While POSS pendants that were closely linked to the polynorbornene main chain by 3- and 6-atom-chain spacers did not induce a breakway from the R$_{g,z}$ scaling of coil-like polymer (v=0.429 for P1 and 0.497 for P2), POSS pendants linked by 16-atom-chain spacers led to that of rod-like polymer (v=0.765 for P3). These findings are opposite to our original anticipation that a shorter distance between bulky POSS pendants and main chain may be more effective to induce the rod-like conformation of main chain. It turned out that the R$_{g,z}$ scale was P1>P2>P3 in the DP$_w$ range below a cross point (DP$_w$<560), but was P3>P2>P1 for the scale in the opposite range (DP$_w$>560). This indicates that the steric effect of bulky POSS pendants on the main chain extension is well delivered to low-DP polymers with short spacers or high-DP polymers with long flexible spacers.

We speculated about the reason for the unique effect of spacer length on the main chain rigidity in light of the phase separation between POSS pendants and main chains. When the phases of POSS pendants and polynorbornene main chains are mixed by short spacers, the self-organization of POSS pendants may be adapted to the amorphous arrangement of polynorbornene main chains, which can lead to the dimensional scaling of polymers according to a tendency for coil polymers. When POSS pendants are separated from the main chain by long flexible spacers, their motion for self-organization may dominate over the segmental motion of amorphous main chains. This can increase the efficiency of the steric repulsion of POSS pendants. As a result, the amorphous polynorbornene can be extended to adopt a rod-like conformation at high DP. Indirect evidence was observed in the physical properties of polymers in solids that were determined by differential scanning calorimetry (DSC) and wide-angle X-ray scattering (WAXS) analyses.

Figure 6A:
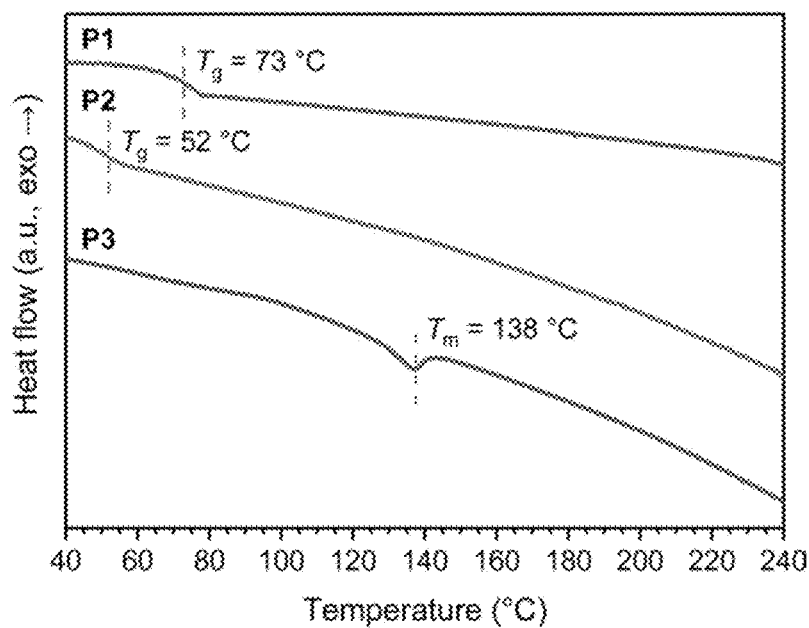
FIGS. 6A and 6B include (A) DSC thermograms recorded on second heating cycle at a heating rate of 2° C./min under a nitrogen atmosphere and (B) WAXS profiles of P1 ($M_n$=1042 kDa; Đ=1.10), P2 ($M_n$=736 kDa; Đ=1.13) and P3 ($M_n$=1236 kDa; Đ=1.20).

Thermal properties of P1 (Mn=1042 kDa; Đ=1.10), P2 ($M_n$=736 kDa; Đ=1.13) and P3 ($M_n$=236 kDa; Đ=1.20) were examined by DSC on the second heating at a rate of 2° C./min under a nitrogen atmosphere (FIG. 6A). DSC thermograms of P1 and P2 showed endothermic shifts of heat flows corresponding to the glass transitions. This indicates that the polynorbornene main chains of P1 and P2 are amorphous. The glass transition temperatures ($T_g$) of P1 and P2 were observed as 73 and 52° C., respectively. Although POSS molecules intrinsically have crystalline behavior, the lack of crystalline domains in P1 and P2 was confirmed by the absence of any endothermic peak corresponding to the melting transition. This was considered due to the mixing between the POSS pendants and the amorphous main chain by the short spacers. On the other hand, $T_g$ of P3 was hardly detected. Instead, a melting temperature ($T_m$) appeared at 138° C. The existence of crystal phases i evidence for the phase separation between POSS pendants and the polynorbornene main chains.

Figure 6B:
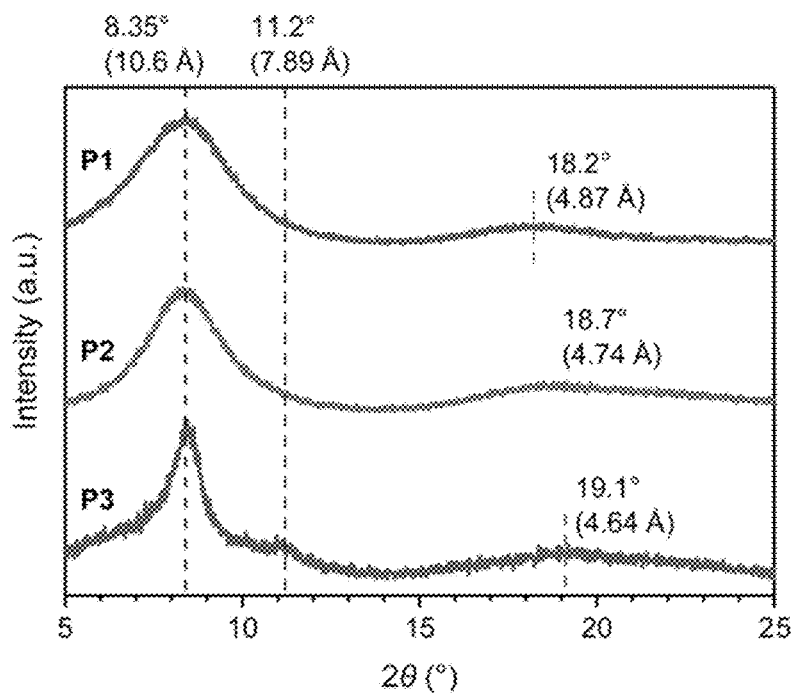
Figure 7:
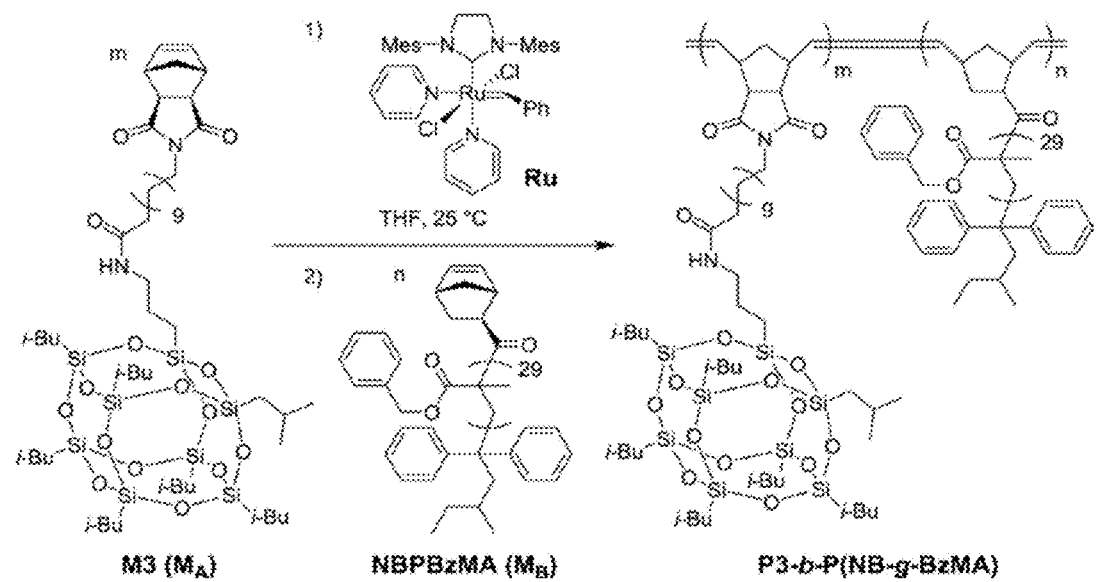
FIG. 7 shows Block copolymerization of M3 ($M_A$: MW=1218 Da) and NBPBzMA ($M_B$: $M_n$=5440 Da, Đ=1.02) via sequential ROMP initiated by Ru in THF at 25° C. (Scheme 2).

The organization structures of POSS pendants in P1 ($M_n$=1042 kDa; Đ=1.10), P2 ($M_n$=736 kDa; Đ=1.13) and P3 ($M_n$=1236 kDa; Đ=1.20) were examined by WAXS (FIG. 6B). WAXS profiles of P1-3 showed two common broad diffraction peaks at 2θ=8.35 and 18.2-19.1°, corresponding to d-spacing values of 10.6 and 4.87-4.64 Å, respectively. The two types of d-spacing values are assigned as the overall size of the POSS molecules (10.6 Å) and the average interdistance between POSS cores (4.87-4.64 Å). The broadness of the two diffraction peaks reflects the phase mixing of the POSS pendants and amorphous main chains. The diffraction peaks became sharper with the increase in spacer length, indicating that the phase of POSS pendants and main chains are more efficiently separated by longer spacers. Closer packing of POSS pendants by increasing spacer length was confirmed by the slightly decreased average interdistance between POSS cores, which also supports the claim. The WAXS profiles of P1 and P2 exhibiting only two broad diffraction peaks indicated the amorphous organization of POSS clusters. The amorphous POSS clusters do not exhibit the melting transition as proven in DSC thermograms. In contrast, the WAXS profile of P3 showed the appearance of an additional diffraction peak at 2θ=11.2° corresponding to the d-spacing value of 7.89 Å, as well as the narrowness of the diffraction peak at 2θ=8.35°. The three d-spacing values of 10.6, 7.89, and 4.64 Å are assigned to the (101), (110), and (113) planes of the rhombohedral unit cell, respectively.[25] Our previous study proved that the crystalline POSS clusters in P3 are collapsed as they are altered to the amorphous clusters at a temperature above $T_m$.

The DSC and WAXS results suggest the possibility that the enthalpic contribution to the semicrystalline arrangement of POSS pendants gained by long flexible spacers might overcome the entropic penalty of amorphous polynorbornene main chains. This effect might be combined with the pure steric factors of POSS units, facilitating great steric repulsion of POSS pendants. Although no evidence emerged, the multiple hydrogen-bonding of amide units for the inter/intramolecular interaction of long flexible spacers might also participate in this process.

Synthesis and self-assembly of POSS-bottlebrush BCPs (POSSBBCPs). It was clear that the rod-like structure of POSS-containing polynorbornene can be attained by M3 possessing long flexible spacers. Next, the sequential ROMP of M3 and a macromonomer was performed to prepare rod-like POSS-bottlebrush BCPs (POSSBBCPs) that contain POSS pendants in the A block and polymeric grafts in the B block. This was intended to compare the main chain dimensions of POSS-containing block and bottlebrush block with similar main chain rigidity.

We utilized exo-5-norbornene-2-carbonyl-end poly(benzyl methacrylate) (NBPBzMA: $M_n$=5440 Da, Đ=1.02). This macromonomer was previously prepared by living anionic polymerization and a subsequent end-capping reaction using exo-5-norbornene-2-carbonyl chloride. The nucleophilic acyl substitution using the carbonyl chloride quantitatively proceeded with enolate anions originating from the methacrylate. Consequently, this procedure yielded a macromonomer with a predictable MW, low dispersity and ~100% norbornenyl-end-functionality. The ROMP was performed by the addition of M3 (monomer A, $M_A$) at $[M_A]_0/[I]_0$=500 followed by NBPBzMA (monomer B, $M_B$) with varying the amount of $M_B$ ($M_A$:$M_B$=67:33, 50:50 and 33:67 wt:wt) to afford three P3-b-P(NB-g-BzMA)s with different block compositions (Scheme 2). The block copolymerization procedure for P3-b-P(NB-g-BzMA) was well established through our last study. We found that the two blocks exhibit similar main chain rigidity, despite the high MW asymmetry of the two types of repeating units.

The results of block copolymerization are summarized in Table 3. The attempts for $M_A$:$M_B$=50:50 and 33:67 wt:wt were performed in our previous report (Table 3, entry 32,33). All P3-b-P(NB-g-BzMA)s were quantitatively obtained. Therefore, weight percentages of P3 ($f_A$=67/50/34 wt %) well accorded with the expected ones. Those POSSBBCPs possessed Mn values of 890/1022/1345 kDa and Đ values of 1.07/1.06/1.29. Values of the number-average DP for P3 and P(NB-g-BzMA) ($DP_A$ and $DP_B$) were calculated from $f_A$ and $M_n$ values. The MW precision of block copolymerization largely depended on the ratio of NBPBzMA. The POSSBBCPs generally had $M_n$ values (890/1022/1345 kDa) lower than the $M_{n,theo}$ values (914/1218/1791 kDa) despite the quantitative convs, and the gap increased with the increase in weight percentage of $M_B$. In addition, the dispersity of POSSBBCP at $M_A$:$M_B$=33:67 wt:wt was much higher than the dispersities of the others. The $M_n$ values lower than expected was presumed to be attributed to a partial intramolecular chain transfer starting from the addition of NBPBzMA. Accordingly, we considered that both $DP_A$ and $DP_B$ values would be lower than $[M_A]_0/[I]_0$ and $[M_B]_0/[I]_0$ values.

TABLE 3

Block copolymerization of M3 ($M_A$: MW = 1218 Da, $[M_A]_0$ = 0.4M) and NBPBzMA
($M_B$: $M_n$ = 5440 Da, Đ = 1.02, $[M_B]_0$ = 0.1M) via sequential ROMP initiated by Ru (I) in THF at 25° C.

| Entry | $M_A:M_B$ (wt:wt) | $[M_A]_0/[I]_0:[M_B]_0/[I]_0$ | Conv/%$^a$ $M_A:M_B$ | $f_A{}^b$ (wt %) | $M_{n,\,theo}{}^c$ (kDa) | $M_n{}^a$ (kDa) | Đ$^a$ | $M_n/M_{n,\,theo}$ | $DP_A:DP_B{}^d$ |
|---|---|---|---|---|---|---|---|---|---|
| 31$^e$ | 67:33 | 500:56 | 100:100 | 67 | 914 | 890 | 1.07 | 0.974 | 499:54 |
| 32$^f$ | 50:50 | 500:112 | 100:100 | 50 | 1218 | 1022 | 1.06 | 0.839 | 420:94 |
| 33$^f$ | 33:67 | 500:224 | 100:97 | 34 | 1791 | 1345 | 1.29 | 0.751 | 375:163 |

$^a$Determined from SEC-MALLS.
$^b$$f_A$: weight percentage of P3 block in P3-b-P(NB-g-BzMA).
$^c$$M_{n,\,theo}$ = $[M_A]_0/[I]_0$ × conv/100% × MW of $M_A$ + $[M_B]_0/[I]_0$ × conv/100% × MW of $M_A$.
$^d$DP of P3 block: DP of P(NB-g-BzMA) block estimated from $f_A$ and $M_n$ values.
$^e$This work.
$^f$Reference: 55.

Figure 8:
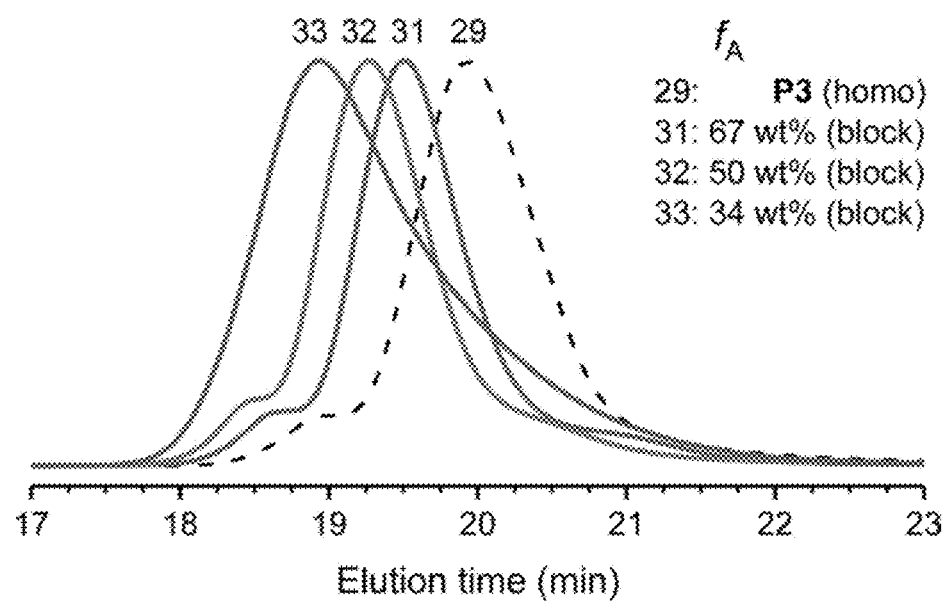
FIG. 8 shows SEC-dRI traces of P3 homopolymer (entry 29; $M_n$=626 kDa; Đ=1.12) and P3-b-P(NB-g-BzMA)s with $f_A$=67/50/34 wt % (entry 31/32/33; $M_n$=890/1022/1345 kDa; Đ=1.07/1.06/1.29).

SEC-dRI traces of P3-b-P(NB-g-BzMA)s with $f_A$=67/50/34 wt % ($M_n$=890/1022/1345 kDa; Đ=1.07/1.06/1.29) revealed that the sequential ROMP generated small portions of low- and high-MW byproducts (FIG. 8). High-MW byproducts were contained only in POSSBBPCs with $f_A$=67 and 50 wt %, but low-MW byproducts were commonly contained in all POSSBBCPs. In particular, the proportion of low-MW byproducts noticeably increased at $f_A$=34 wt % We considered that the high- and low-MW byproducts are the results of inter- and intramolecular chain transfer, respectively, which might occur during ROMP. From the observation of $M_n$ values smaller than $M_{n,theo}$, it seemed that intramolecular chain transfer was more active than intermolecular transfer. The highly sterically demanding structure of NBPBzMA might cause significant competition between propagation and intramolecular chain transfer. Nevertheless, the comparison between SEC-dRI traces of P3 homopolymer and POSSBBCPs showed the clear shift of the main trace to higher-MW regions after the subsequent addition of NBPBzMA.

Figure 9A:
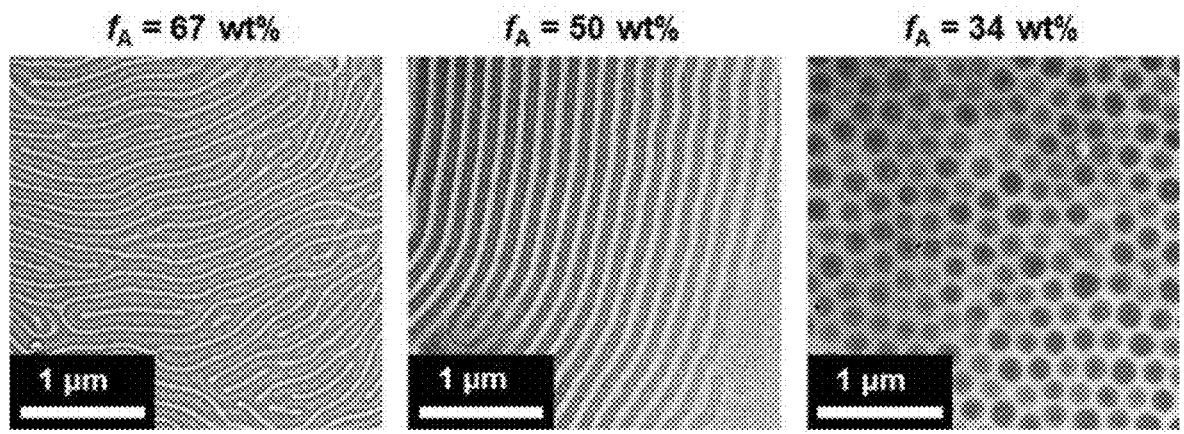
FIGS. 9A, 9B, and 9C include (A) TEM micrographs of thin films of self-assembled P3-b-P(NB-g-BzMA)s with $f_A$=67/50/34 wt % ($M_n$=890/1022/1345 kDa; Đ=1.07/1.06/1.29) and illustrations of (B) their nanostructured morphologies and (C) possible chain arrangement. $f_A$=(left column) 67 wt %, (middle column) 50 wt %, and (right column) 34 wt %. Dark and bright regions in TEM micrographs represent P3 and P(NB-g-BzMA) domains, respectively. Red and blue regions in illustrations represent P3 and P(NB-g-BzMA) domains, respectively.
Figure 9B:
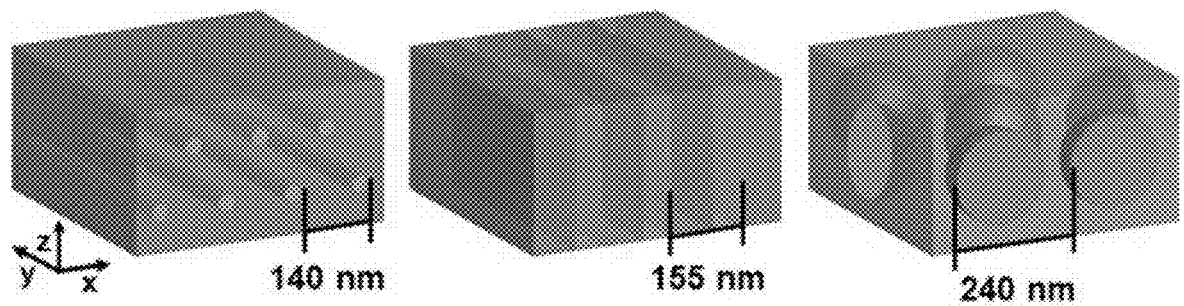

The self-assembly of three P3-b-P(NB-g-BzMA)s with $f_A$=67/50/34 wt % ($M_n$=890/1022/1345 kDa; Đ=1.07/1.06/1.29) were exploited in their thin films. The POSSBBCP thin films were fabricated by the drop-casting of solutions with appropriate concentrations in THF onto carbon-coated copper grids. Solvent vapor annealing using THF was performed immediately after casting to assist in the diffusion of high-MW chains. Morphologies of POSSBBCP thin films were identified by transmission electron microscopy (TEM) analysis, in which P3 and P(NB-g-BzMA) domains appear dark and bright in TEM micrographs, respectively. The analysis results showed that three POSSBBCPs efficiently self-assembled under the THF vapor to form ordered nanostructures with distinct morphologies that are dependent on the block composition. Parallel-oriented P(NB-g-BzMA) cylinders, perpendicular-oriented lamellae, and P3 spheres were displayed for samples with $f_A$=67, 50, and 34 wt %, respectively (FIG. 9A). In addition, periodicity ($L_0$) values were observed to be approximately 140, 155, and 240 nm for the P(NB-g-BzMA)-cylindrical, lamellar, and P3-spherical morphologies, respectively (FIG. 9B).

For P3-b-P(NB-g-BzMA)s with $f_A$=67 wt %, P(NB-g-BzMA) cylinders were locally ordered to form a hexagonally packed array in the bilayer. A monolayer of those cylinders was also displayed in the region with relatively low thickness (FIG. S14). For P3-b-P(NB-g-BzMA)s with $f_A$=50 wt %, perpendicular-oriented lamellae were formed only in small areas, due to the dewetting that occurred prior to the complete vertical orientation. The long-range perpendicular orientation of cylinders and lamellae is not preferred in P3-b-P(NB-g-BzMA)s, due to the low surface free energy (SFE) of the Si-containing polymer. The morphological limitation is expected to be easily solved by replacement with an appropriate counter block with an SPE comparable to that of P3.[67] For P3-b-P(NB-g-BzMA)s with $f_A$=34 wt %, P3 spheres were locally ordered to form a hexagonally packed array in the monolayer.

Figure 9C:
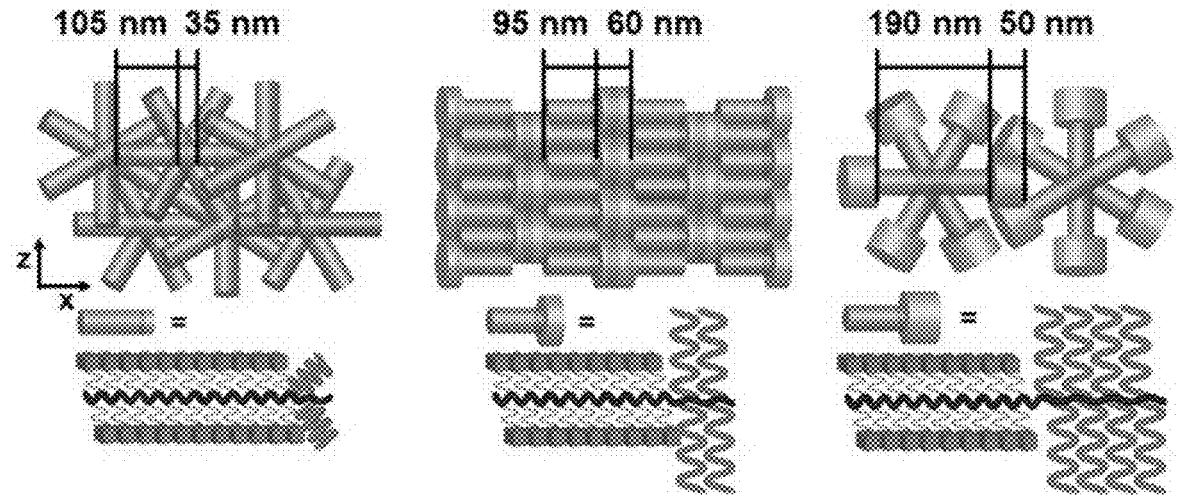
Figure 10:
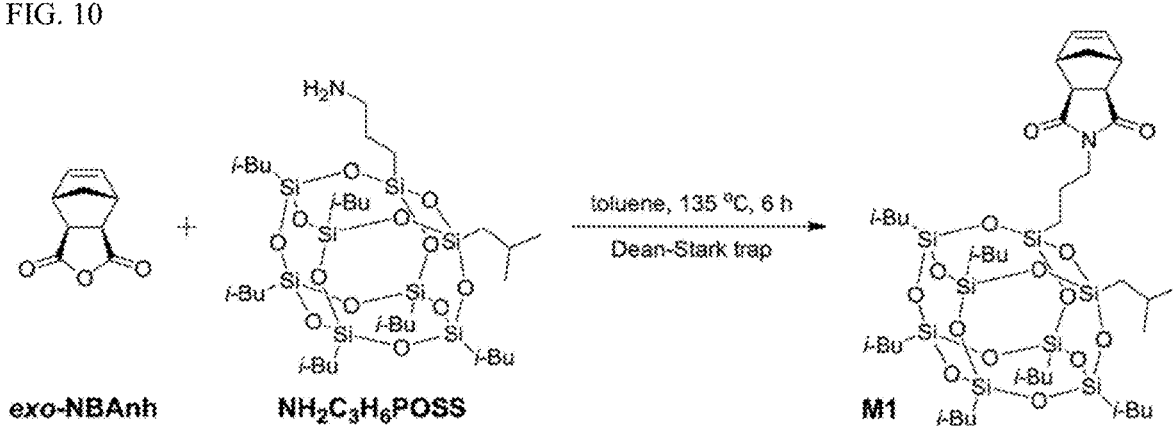
FIG. 10 shows Synthesis procedures for POSS-substituted monomer (M1)
Figure 11:
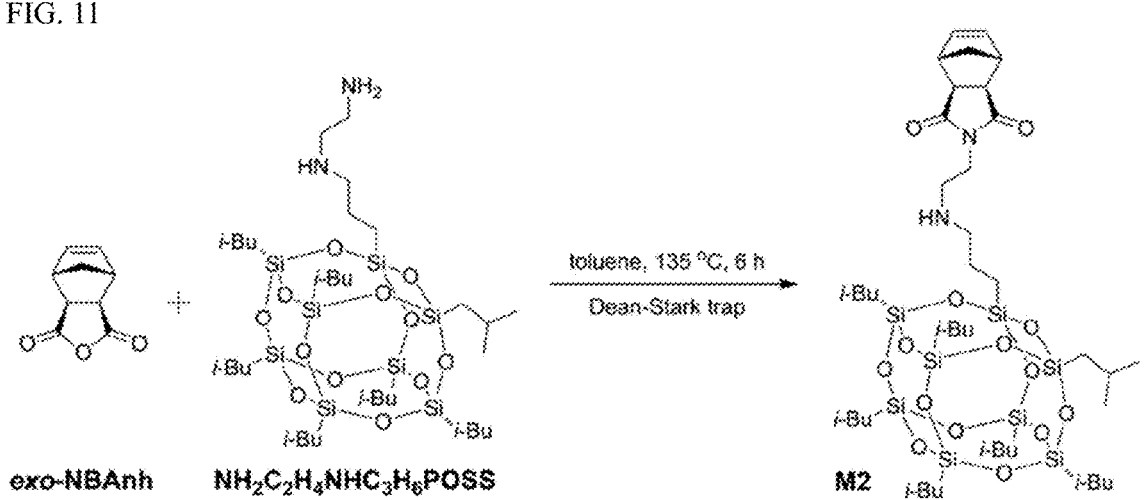
FIG. 11 shows Synthesis procedures for POSS-substituted monomer (M2)
Figure 12:
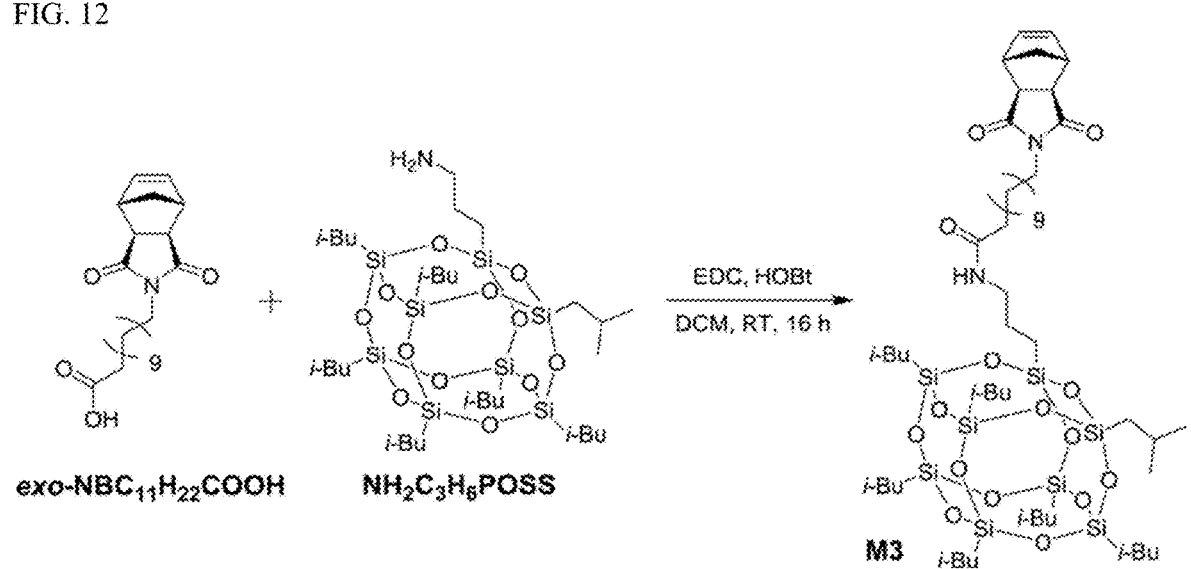
FIG. 12 shows Synthesis procedures for POSS-substituted monomer (M3)
Figure 13:
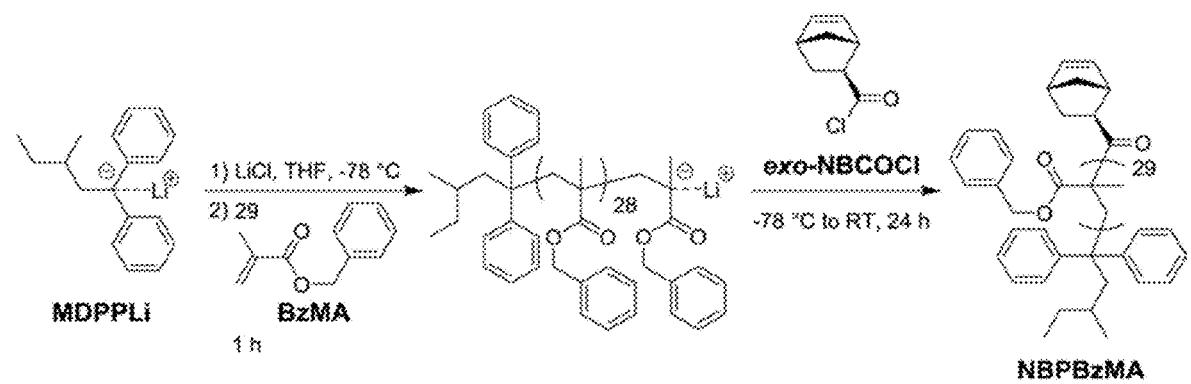
FIG. 13 shows Synthesis procedures for POSS-substituted monomers (NBPBzMA)
Figure 14:
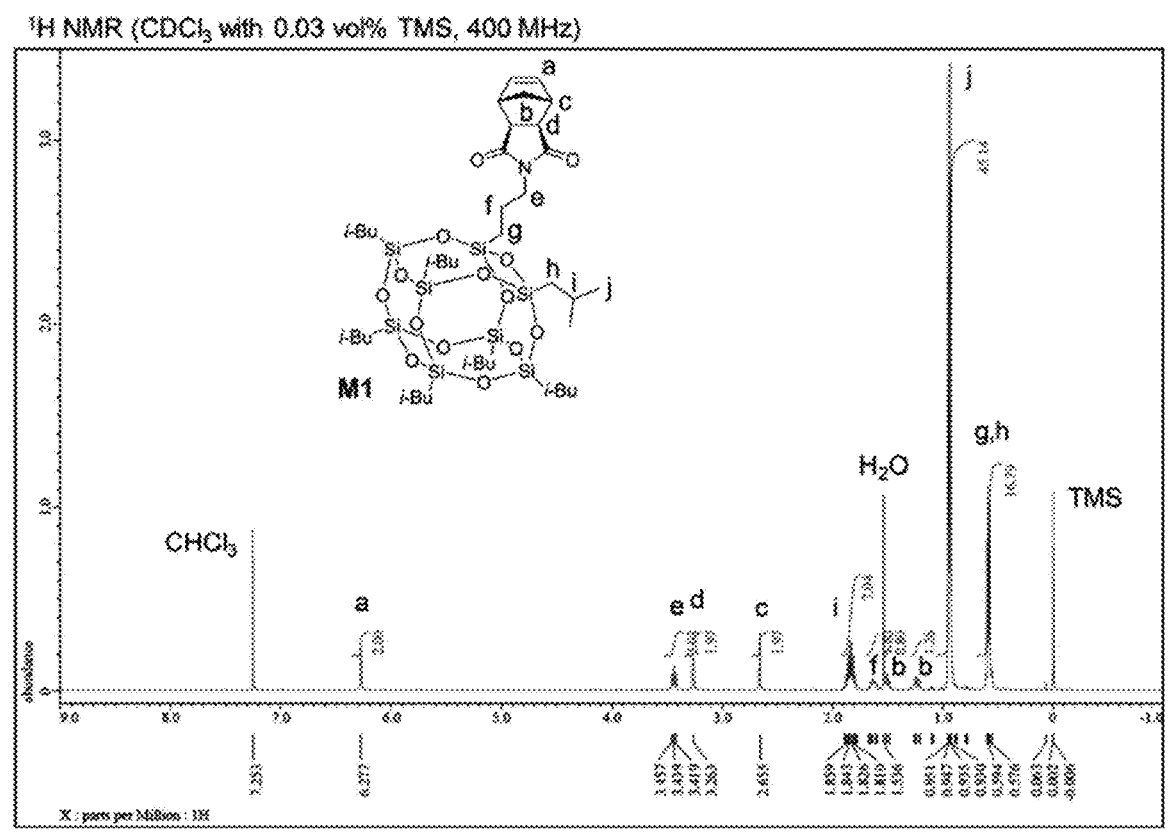
FIG. 14 shows $^1$H NMR spectrum of M1 in CDCl$_3$ (S1).
Figure 15:
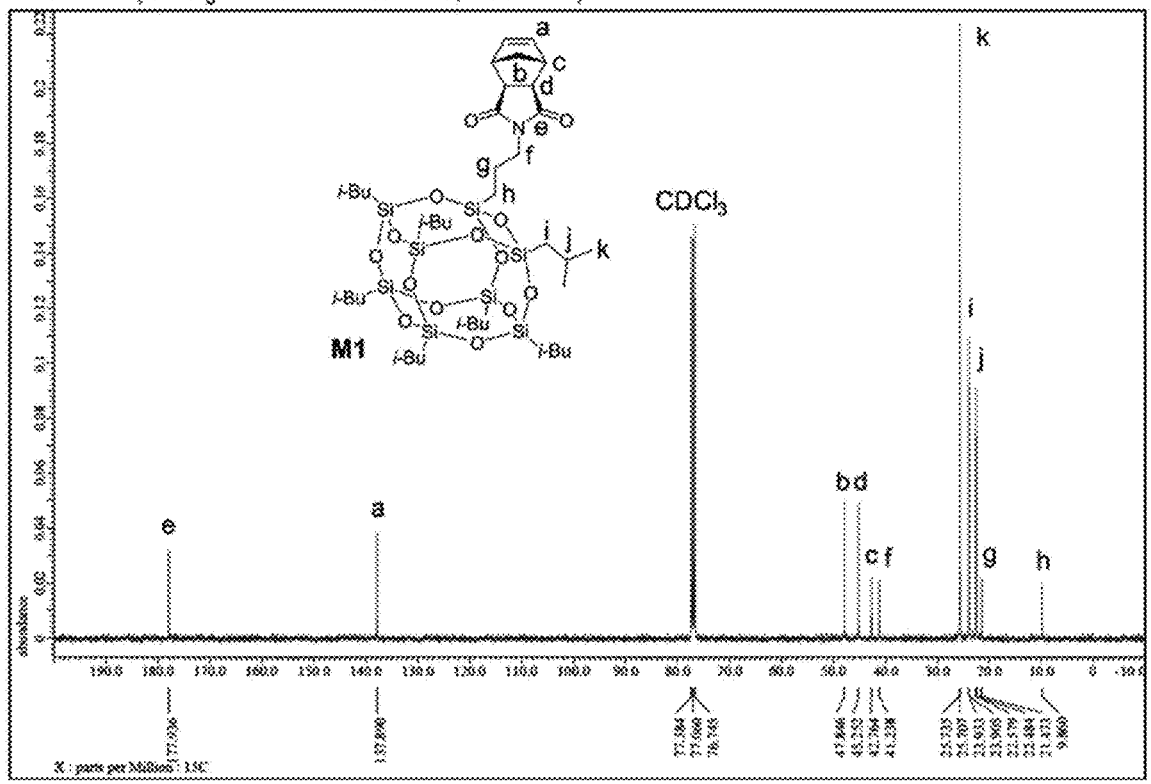
FIG. 15 shows $^{13}$C NMR spectrum of M1 in CDCl$_3$ (S2).
Figure 16:
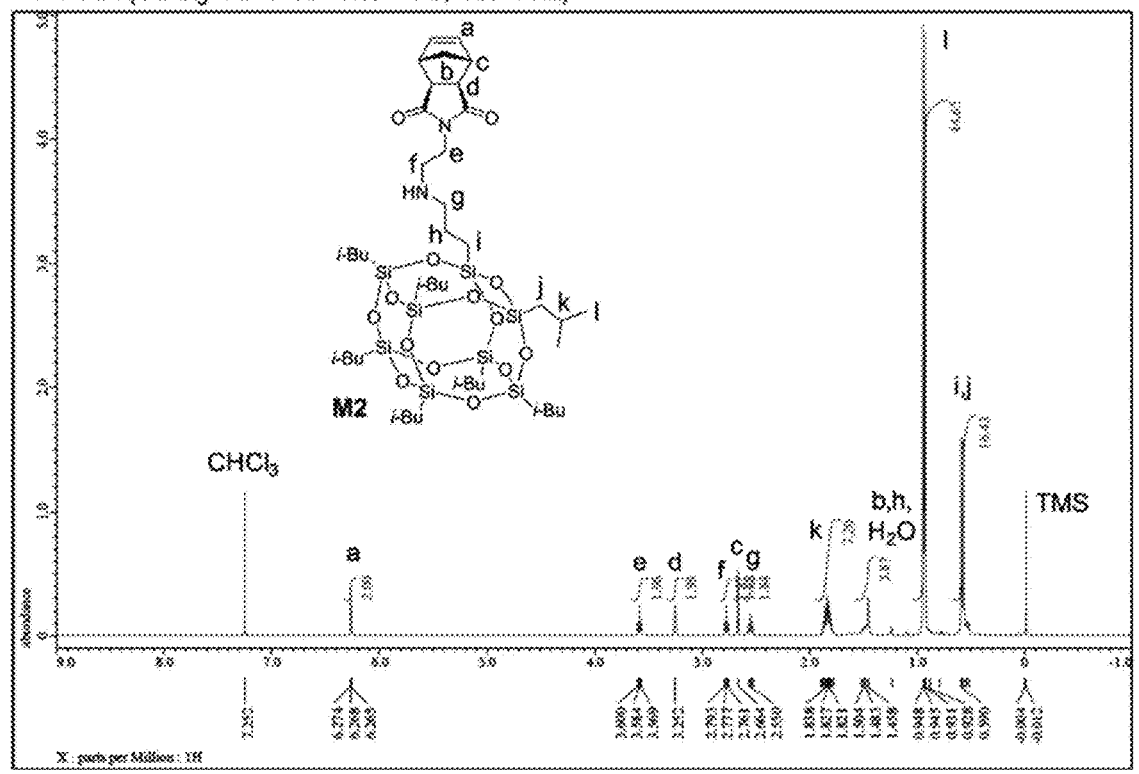
FIG. 16 shows $^1$H NMR spectrum of M2 in CDCl$_3$ (S3).
Figure 17:
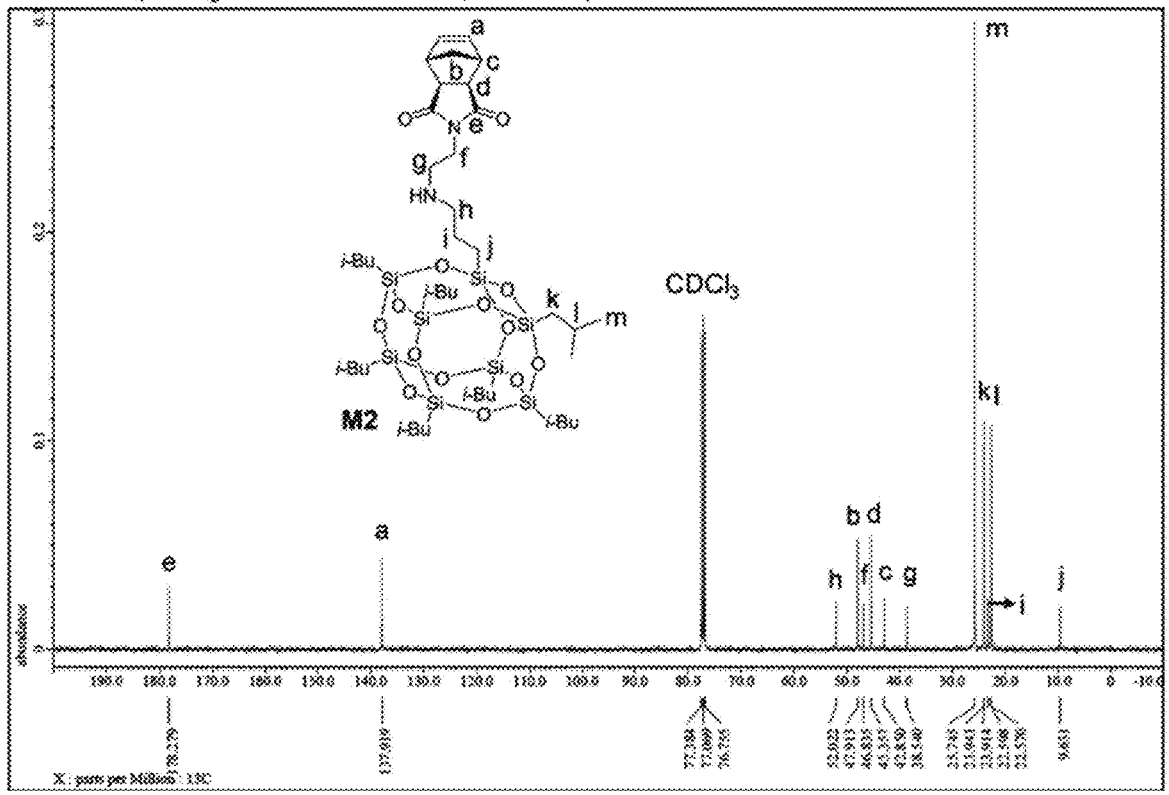
FIG. 17 shows $^{13}$C NMR spectrum of M2 in CDCl$_3$ (S4).
Figure 18:
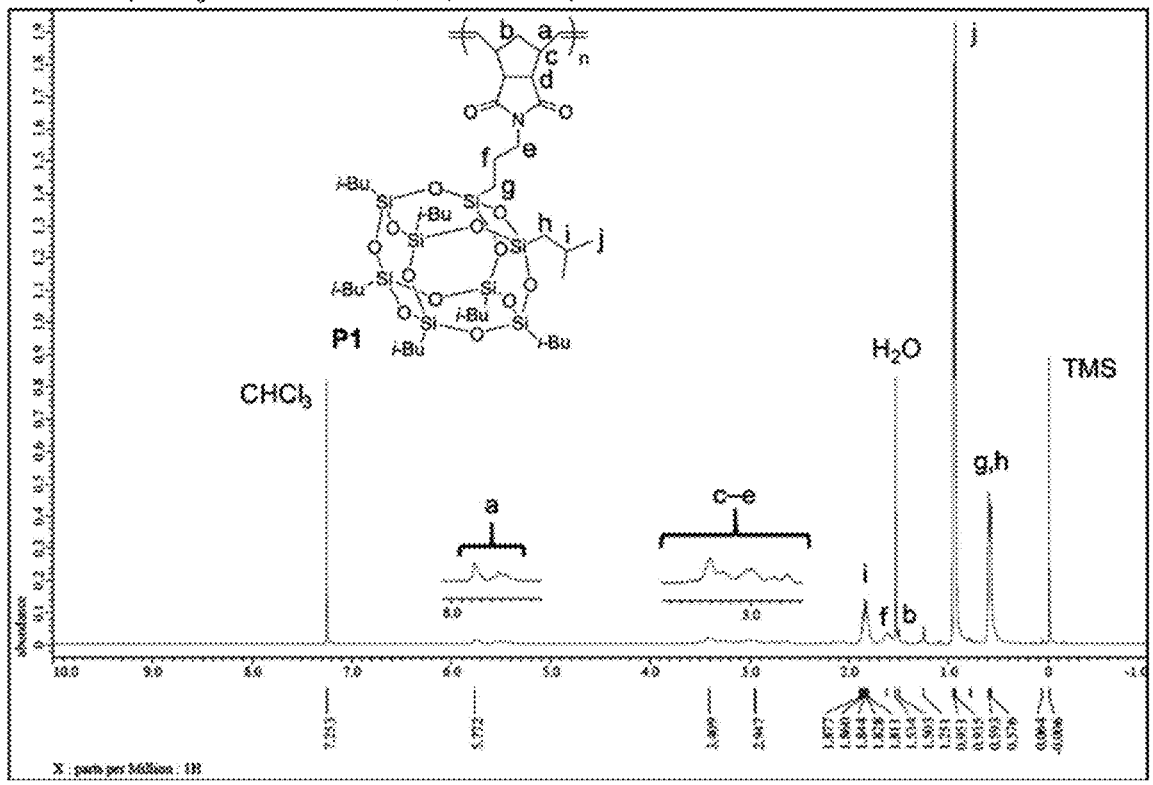
FIG. 18 shows $^1$H NMR spectrum of P1 in CDCl$_3$ (S5).
Figure 19:
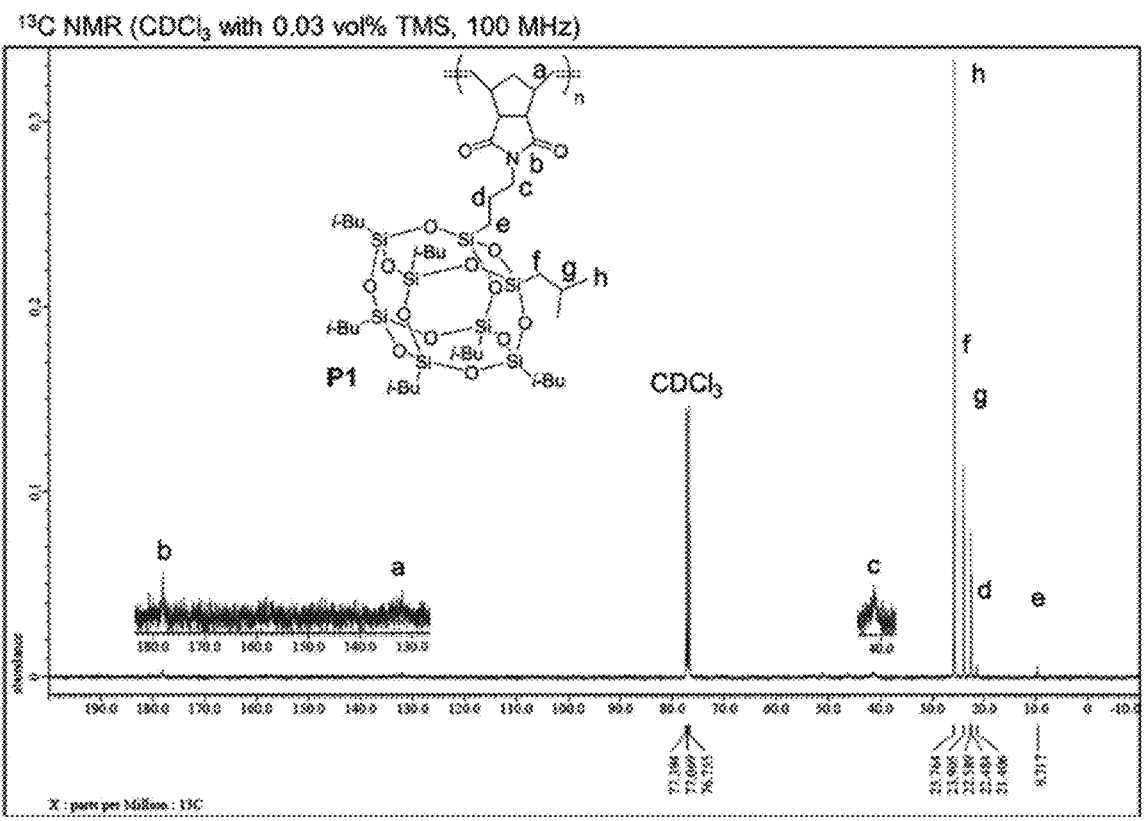
FIG. 19 shows $^{13}$C NMR spectrum of P1 in CDCl$_3$ (S6).
Figure 20:
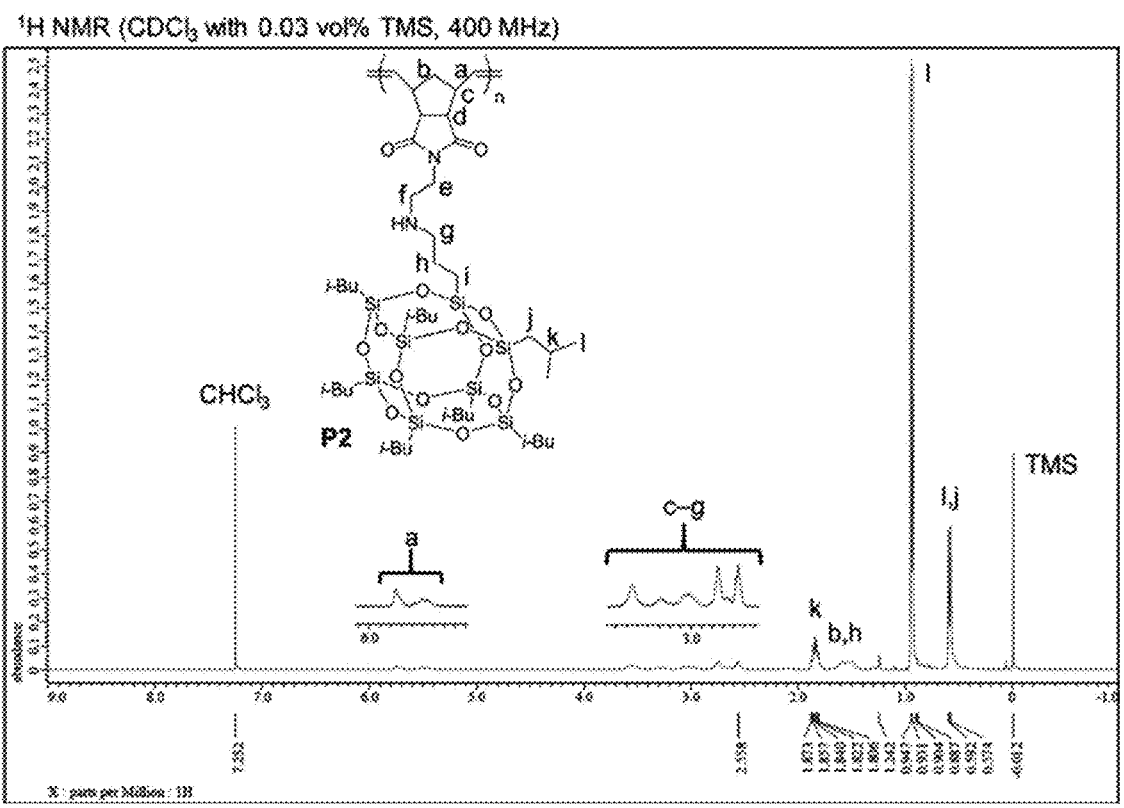
FIG. 20 shows $^1$H NMR spectrum of P2 in CDCl$_3$ (S7).
Figure 21:
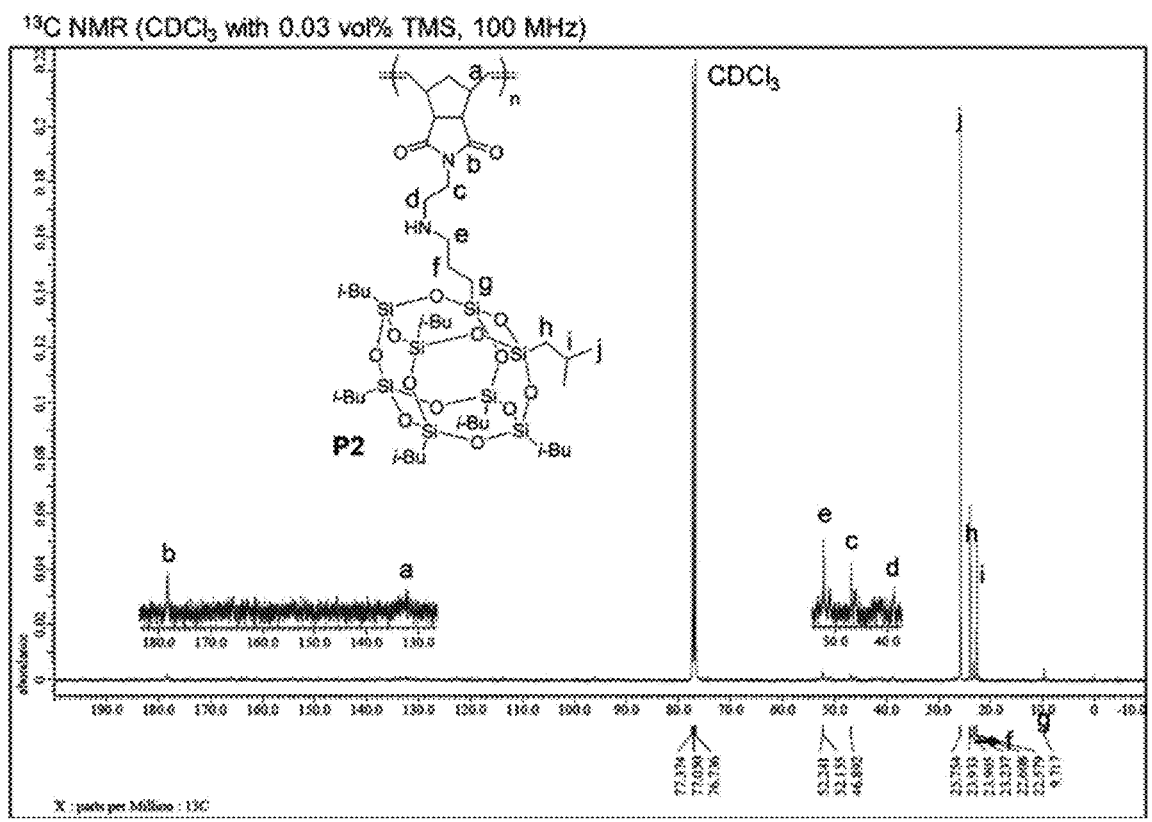
FIG. 21 shows $^{13}$C NMR spectrum of P2 in CDCl$_3$ (S8).
Figure 22:
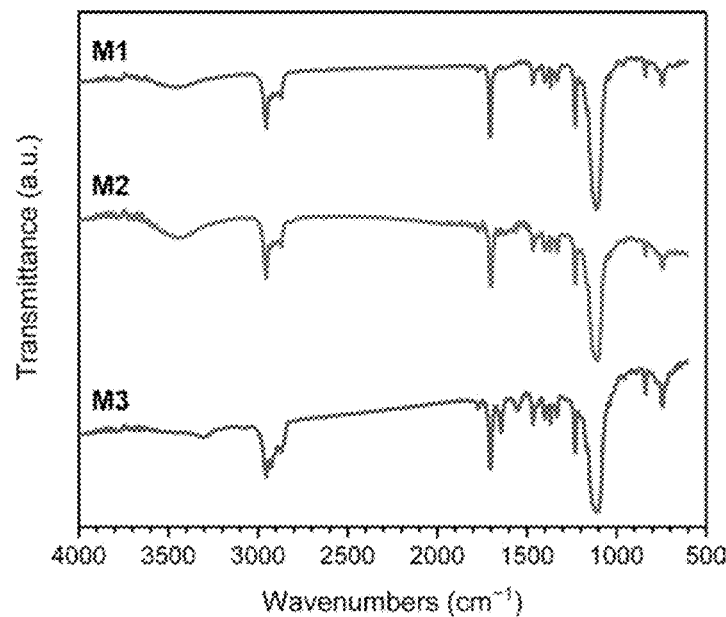
FIG. 22 shows FT-IR spectra of M1-3 (S9).
Figure 23:
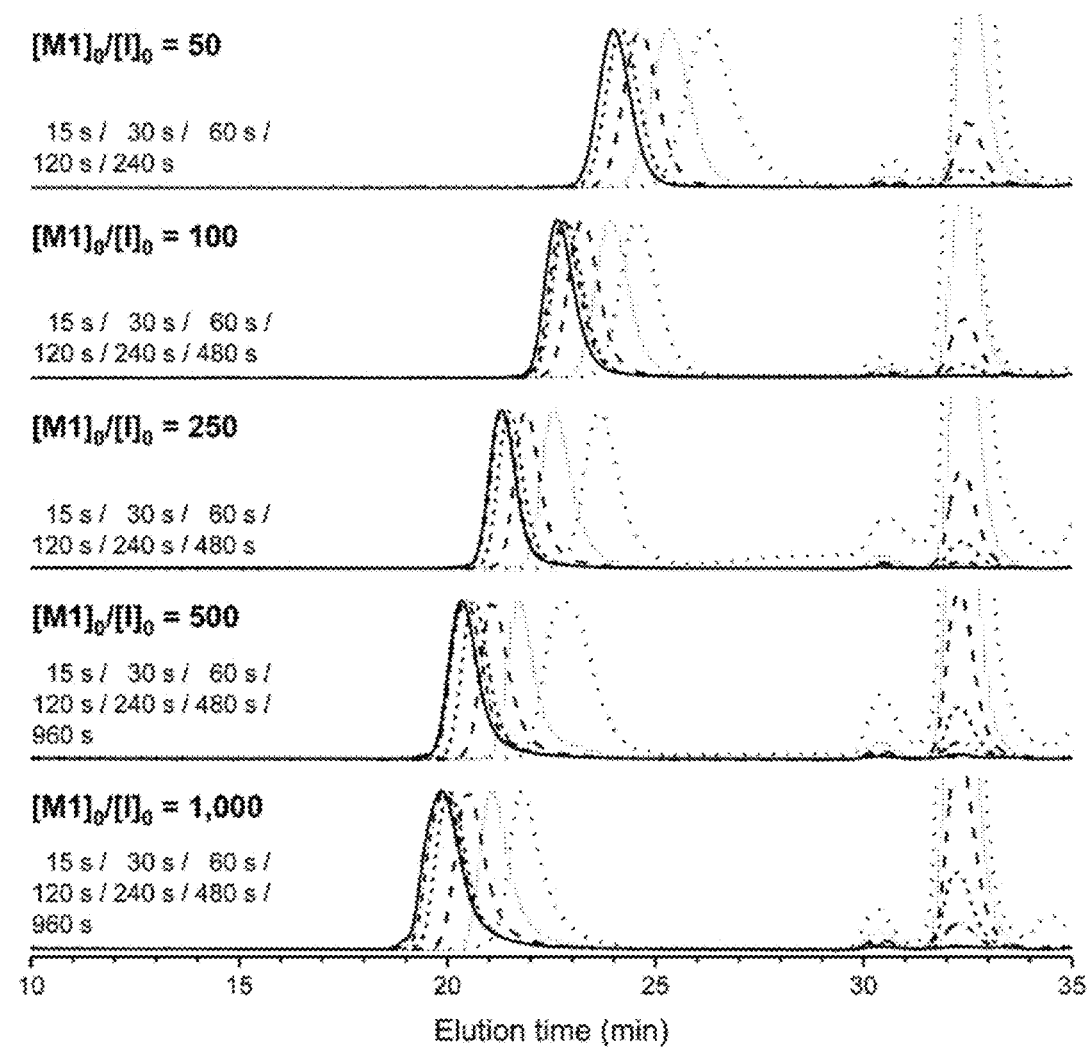
FIG. 23 shows SEC-dRI traces of P1 aliquots (entry S11-31) extracted from the homopolymerization mixtures ($[M1]_0$=0.1 M) at different time intervals (S10).
Figure 24:
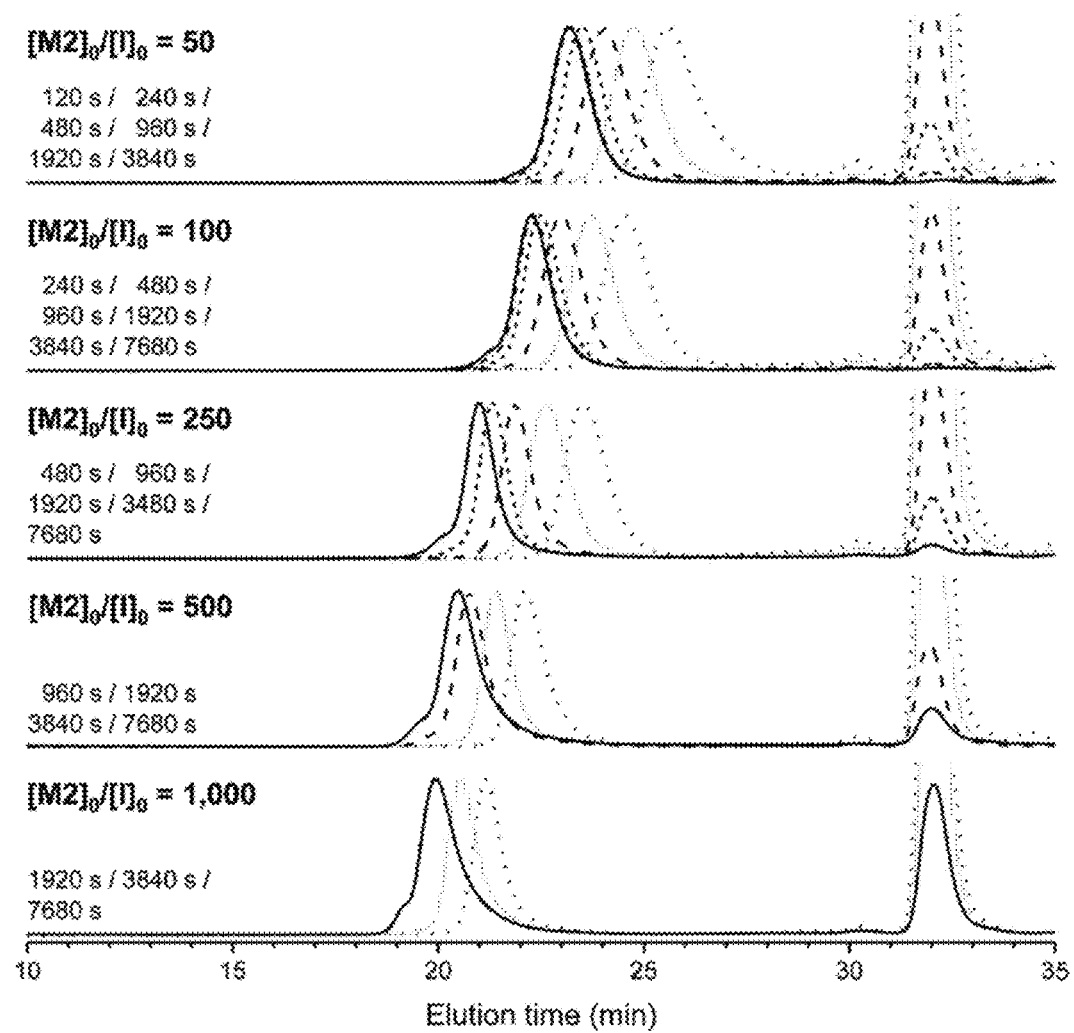
FIG. 24 shows SEC-dRI traces of P2 aliquots (entry S32-55) extracted from the homopolymerization mixtures ($[M2]_0$=0.1 M) at different time intervals (S11).
Figures 25, 26:
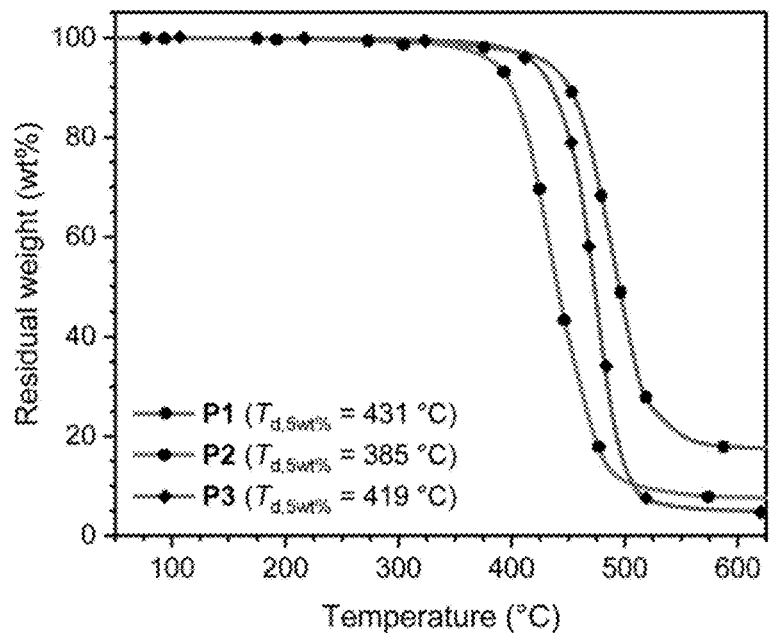
FIG. 25 shows SEC-dRI traces of P3 aliquots (entry S56-81) extracted from the homopolymerization mixtures ($[M3]_0$=0.1 M) at different time intervals (S12).
FIG. 26 shows TGA thermograms of P1 ($M_n$=1042 kDa; Đ=1.10), P2 ($M_n$=736 kDa; Đ=1.13) and P3 ($M_n$=1236 kDa.

The domain spacing (d) for each block ($d_A$ for P3 and dB for P(NB-g-BzMA)) in lattice plane was approximately determined from the TEM micrographs. Confirmation of the relationship between d and DP values helped to identify the distinguished mode of chain arrangement for each block (FIG. 9C). P3 and P(NB-g-BzMA) chains would be arranged to interdigitated monolayers and bilayers, respectively, for the P3-cylindrical and lamellar formation, but arranged reversely for the P(NB-g-BzMA)-spherical formation. The different modes of chain arrangement P3 and P(NB-g-BzMA) in the lamellar structures would be attributed to the large asymmetry in side chain length. A similar trend was also observed in our previous study on the lamellar self-assembly of P3-b-P(NB-g-BzMA)s in bulk. The long side-chain length of P(NB-g-BzMA) block seemed not to be favorable for the cylindrical self-assembly of P3-b-P(NB-g-BzMA) with $f_A$=67 wt %. Accordingly, we assumed that the P(NB-g-BzMA) chains might shrink to adjust their volume appropriately for the efficient cylindrical formation.

Based on the observed characteristics, the main chain length (l) of each block ($l_A$ for P3 and $l_B$ for P(NB-g-BzMA) was estimated as d for the interdigitated chains and d/2 for the bilayered chains. Next, the main chain length per unit $M_n$($l/M_n$) of each block ($l_A/M_{n,A}$ for P3 and $l_B/M_{n,B}$ for P(NB-g-BzMA)) was defined as an indicator of dimensional expansion efficiency. The calculated result showed that $l_A/M_{n,A}$ values are 3-4 times higher than $l_B/M_{n,B}$ values (Table 4). This suggests that the molecular structure of P3 had more potential than the brush polymers in extending the main chain length to reach a target point with lower MW.

TABLE 4

Morphological and dimensional characteristics for self-assembled P3-b-P(NB-g-BzMA)s with $f_A$ = 67/50/34 wt % ($M_n$ = 890/1022/1345 kDa; Đ = 1.07/1.06/1.29) in thin films

| Polymer | $f_A$ (wt %) | Thin film morphology[a] | $L_0$ (nm) | $d_A{:}d_B{}^a$ (nm) | $l_A{:}l_B{}^b$ (nm) | $l_A/M_{n,\,A}{:}l_B/M_{n,\,B}$ (nm kDa$^{-1}$) |
|---|---|---|---|---|---|---|
| Entry 31 | 67 | P(NB-g-BzMA) cylinders | 140 | 105:35 | 105:17.5 | 0.176:0.0595 |
| Entry 32 | 50 | lamellae | 155 | 95:60 | 95:30 | 0.186:0.0587 |
| Entry 33 | 34 | P3 spheres | 240 | 190:50 | 95:50 | 0.214:0.0555 |

[a]Determined from TEM micrographs.
[b]Estimated as d for interdigitated chains and ≈d/2 for bilayered chains.

CONCLUSIONS

We developed an effective protocol based on molecular and kinetic design for the controlled ROMP of norbornene-substituted POSS monomers to create rod-like polymers with higher MWs. The choice of spacers with mild functionalities allowed controlled ROMP at the maximum monomer concentration to expand the $[M]_0/[I]_0$ range for precise MW control up to 1000. Partial crystallization of POSS pendants enabled by long flexible spacer induced the periodic clustering of sterically bulky POSS pendants through the main chain to substantially increase the main chain rigidity. This effect played the most significant role in enhancing the rod-like main chain conformation of POSS-containing polynorbornenes. Consequently, the synergetic effect of molecular and kinetic control in the ROMP led to the development of rod-like POSS-containing polynorbornenes with high MWs and low dispersities. This protocol was also applicable to the block copolymerization with a macromonomer to create well-defined rod-like POSSBBCPs that can self-assemble to form ordered nanostructures with diverse morphologies and large periodicities in thin films. It is expected that the presented synthetic strategy is one of the most universal approaches for the controlled synthesis of high-MW rod-like polymers, with a wide variety of bulky pendants.

S1. Experimental Section

S1.1. Materials

Aminopropyl-heptaisobutyl POSS ($NH_2C_3H_6POSS$) and aminoethylaminopropylisobutyl-heptaisobutyl POSS ($NH_2C_2H_4NHC_3H_6POSS$) were purchased from Hybrid Plastics. All other chemical compounds were purchased from commercial suppliers and used without further purification unless otherwise noted. Tetrahydrofuran (THF) was distilled over sodium naphthalenide and degassed at $10^{-6}$ Torr. Hexane was distilled over 1,1-diphenylhexyllithium and degassed at $10^{-6}$ Torr. Lithium chloride (LiCl) was dried with stirring at 150° C. for 24 h at $10^{-6}$ Torr. A 1.4 M sec-butyllithium (s-BuLi) solution in cyclohexane was degassed, appropriately diluted in hexane, divided into clean glass ampules equipped with break-seals at $10^{-6}$ Torr, and stored at −30° C. 1,1-Diphenylethylene (DPE) and benzyl methacrylate (BzMA) were distilled over calcium hydride ($CaH_2$) at reduced pressure and then redistilled over $CaH_2$ at $10^{-6}$ Torr. DPE, LiCl, and BzMA were appropriately diluted in THF, divided into clean glass ampules equipped with break-seals at $10^{-6}$ Torr, and stored at −30° C. 5-Norbornene-exo-2,3-dicarboxylic anhydride (exo-NBAnh), 12-(5-norbornene-exo-2,3-dicarboximido)dodecanoic acid (exo-NBC$_{11}$H$_{22}$COOH) and $RuCl_2(pyridine)_2(H_2IMes)$(CHPh) (Ru) were prepared in our previous work.[S1]

S1.2. Instruments and Analyses

A glove box (Seed Tac Korea Co.) retained a nitrogen atmosphere with 0.1-0.3 ppm of $H_2O$ and 1.0-1.5 ppm of $O_2$ to carry out the ring-opening metathesis polymerization (ROMP). Proton and carbon-13 nuclear magnetic resonance ($^1$H and $^{13}$C NMR) spectra of synthesized compounds were recorded using a JNM-ECX 400 NMR spectrometer (JEOL, 400 MHz) in chloroform-d (CDCl$_3$, 99.8% atom D, contains 0.03 vol % tetramethylsilane) at 25° C. Fourier-transform infrared (FT-IR) spectroscopy for potassium bromide (KBr) pellets containing monomers was conducted using a Nicolet iS10 (Thermo Scientific). Elemental analysis (EA) for monomers was conducted using USNario Max CN (Elementar; combustion temperature: 1800° C.) and Flash 2000 (Thermo Scientific; combustion temperature: 1000° C.). Conversion (conv), number-average molecular weight ($M_n$), weight-average molecular weight ($M_w$), dispersity (Đ=$M_w$/$M_n$), and z-average radius of gyration ($R_{g,z}$) of synthesized polymers were determined using a size exclusion chromatography-multiangle laser light scattering (SEC-MALLS) instrument equipped with a 515 HPLC pump (Waters), a set of four Styragel columns connected in series (HR 0.5, HR 1, HR 3, and HR 4 with pore sizes of 50, 100, 500, and 1000 Å, respectively, Waters), a miniDAWN TREOS light scattering detector (Wyatt Technology), and an Optilab T-rEX refractive index detector (Wyatt Technology). The SEC-MALLS instrument was operated in THF/triethylamine (98/2 v/v) with an elution rate of 1.0 mL/min at 40° C. Refractive index increment (dn/dc) values of polymers were calculated assuming 100% mass recovery of the injected polymer samples. Thermogravimetric analysis (TGA) measurement was performed on a TGA Q50 (TA Instruments) at a heating rate of 10° C./min under a nitrogen atmosphere. Differential scanning calorimetry (DSC) measurement was performed on a DSC Q20 (TA Instruments) at cooling and heating rates of 2° C./min under a nitrogen atmosphere. Wide-angle X-ray scattering (WAXS) profiles were recorded using a Rigaku D/max-2500 diffractometer with Cu-Kα radiation (λ=1.54 Å) at 40 kV and 100 mA. Transmission electron microscopy (TEM) measurement was performed on a Tecnai G2 S-Twin (FEI) at an accelerating voltage of 300 kV. Processing of numerical data was performed on an OriginPro 2017 (OriginLab).

S1.3. Synthesis Procedures for POSS-Substituted Monomers

S1.3.1. 3-(5-Norbornene-exo-2,3-dicarboximido) propyl-heptaisobutyl POSS (M1)

A two-neck 100 mL flask equipped with a Dean-Stark trap was charged with nitrogen for 30 min. To the flask were added toluene (25 mL), exo-NBAnh (0.939 g, 5.72 mmol) and $NH_2C_3H_6POSS$ (5.00 g, 5.72 mmol). The reaction mixture was stirred at 135° C. for 16 h After the reaction was complete, the solution was cooled and concentrated at reduced pressure. The residual mixture was dissolved in DCM (25 mL) and then washed with 0.1 N HCl (10 mL) and brine (10 mL) in sequence. The organic layer was dried over $Na_2SO_4$, filtered, and concentrated at reduced pressure. The recovered solid was precipitated in cool methanol, filtered, and dried under vacuum to afford M1 as a white powder (5.55 g, 95%).

M1: $^1$H NMR ($CDCl_3$ with 0.03% v/v TMS, 400 MHz): δ(ppm) 6.28 (s, 2H), 3.44 (t, 2H, J=7.6 Hz), 3.26 (s, 2H), 2.66 (s, 2H), 1.83 (m, 7H), 1.63 (m, 2H), 1.50 (d, 1H, J=8.0 Hz), 1.22 (d, 1H, J=9.6 Hz), 0.94 (dd, 42H, J=6.4, 1.6 Hz), 0.59 (dd, 16H, J=6.8, 2.0 Hz). $^{13}$C NMR ($CDCl_3$ with 0.03% v/v TMS, 100 MHz): δ(ppm) 177.94, 137.89, 47.85, 45.25, 42.76, 41.24, 25.72, 23.92, 22.53, 21.47, 9.86.

S1.3.2. 3-(2-(5-Norbornene-exo-2,3-dicarboximido)ethylamino)propyl-heptaisobutyl POSS (M2)

A two-neck 100 mL flask equipped with a Dean-Stark trap was charged with nitrogen for 30 min. To the flask were added toluene (25 mL), exo-NBAnh (0.895 g, 5.45 mmol) and $NH_2C_2H_4NHC_3H_6POSS$ (5.00 g, 5.45 mmol). The reaction mixture was stirred at 135° C. for 6 h. After the reaction was complete, the solution was cooled and concentrated at reduced pressure. The crude product was purified by silica gel column chromatography in hexane/ethyl acetate (initially 8/2 v/v and subsequently 6/4 v/v). The recovered solid was precipitated in cool methanol, filtered, and dried under vacuum to afford M2 as a white powder (3.16 g, 54%).
M2: $^1$H NMR ($CDCl_3$ with 0.03% v/v TMS, 400 MHz): δ6.27 (s, 2H), 3.58 (t, 2H, J=6.2 Hz), 3.25 (s, 2H), 2.78 (t, 2H, J=6.4 Hz), 2.66 (s, 2H), 2.55 (t, 2H, J=7.2 Hz), 1.83 (m, 7H), 1.48 (quint, 2H, J=8 Hz), 1.46 (s, 2H), 0.94 (dd, 42H, J=6.8, 1.2 Hz), 0.58 (d, 16H, J=6.8 Hz). $^{13}$C NMR ($CDCl_3$ with 0.03% v/v TMS, 100 MHz): δ(ppm) 178.28, 137.92, 52.02, 47.91, 46.84, 45.36, 42.85, 38.54, 25.75, 23.93, 22.58, 9.63.

S1.3.3. 3-(12-(5-Norbornene-exo-2,3-dicarboximido)dodecanoylamino)propyl-heptaisobutyl POSS (M3)

The synthesis procedure for M3 is described in our previous report[S1]
M3: $^1$H NMR ($CDCl_3$ with 0.03% v/v TMS, 400 MHz): δ(ppm) 6.28 (s, 2H), 5.42 (s, 1H), 3.44 (t, 2H, J=7.6 Hz), 3.26 (s, 2H), 3.29-3.17 (m, 4H), 2.66 (s, 2H), 2.13 (t, 2H, J=7.6 Hz), 1.84 (m, 7H), 1.66-1.44 (m, 8H), 1.24 (m, 14H), 0.95 (d, 42H, J=6.4 Hz), 0.59 (dd, 16H, J=6.8, 1.2 Hz). $^{13}$C NMR ($CDCl_3$ with 0.03% v/v TMS, 100 MHz): δ(ppm) 178.08, 172.95, 137.88, 47.86, 45.22, 42.76, 41.73, 38.79, 36.99, 29.65-29.25, 29.14, 27.80, 26.98, 25.89, 25.73, 23.91, 23.14, 22.55, 9.53. Typical NMR spectra of M3 are offered in our previous report.[S1]

S1.3.4. exo-5-Norbornene-2-carbonyl-end poly(benzyl methacrylate) (NBPBzMA)

The synthesis procedure for NBPBzMA is described in our previous report[S1] NBPBzMA: $M_n$=5.44 kDa ($M_{n,theo}$=4.95 kDa at $[BzMA]10_0/[s-BuLi]_0$=26.0). Đ=1.02.
$^1$H NMR ($CDCl_3$ with 0.03% v/v TMS, 400 MHz): δ(ppm) 7.41-7.01 (br), 6.09-5.66 (br), 5.17-4.50 (br), 2.10-0.40 (br). $^{13}$C NMR ($CDCl_3$ with 0.03% v/v TMS, 100 MHz): δ(ppm) 177.14, 135.24, 128.62, 66.86, 54.25, 44.87, 18.57. Typical NMR spectra of NBPBzMA are offered in our previous report[S1]

S1.4. Polymerization Procedures

S1.4.1. Homopolymerization of M1-3 Via ROMP

All ROMP experiments were carried out in a glove box charged with nitrogen. The volumes of THF for monomer and initiator were set according to $[M]_0$=0.1 or 0.4 M. One of the monomers (M1-3) (100 mg) was dissolved in THF in a 10 mL vial, and then the solution was stirred. A 0.01 M solution of Ru in THF was rapidly added via syringe to allow polymerization. The volume of added Ru was set according to $[M]_0/[I]_0$. At regular time intervals, aliquots (50 μL) were extracted and transferred into solutions of ethyl vinyl ether (3 droplets) in THF (1 mL) to terminate the reaction. The aliquots were used for SEC analysis to characterize the conversion, $M_n$, $M_w$, and Đ depending on the reaction time. After final conversion, the resulting polymer was isolated by precipitation in acetonitrile, filtration, and drying under vacuum.

P1: dn/dc=0.0658 mL/g. $^1$H NMR ($CDCl_3$ with 0.03% v/v TMS, 400 MHz): δ(ppm) 5.87-5.24 (br), 3.76-2.46 (br), 1.84 (m), 1.62 (s), 1.50 (s), 0.94 (d, J=6.4 Hz), 0.59 (d, J=6.8 Hz). $^{13}$C NMR ($CDCl_3$ with 0.03% v/v TMS, 100 MHz): δ(ppm) 178.07, 131.89, 41.45, 25.76, 23.91, 22.54, 21.41, 9.72.

P2: dn/dc=0.0760 mL/g. $^1$H NMR ($CDCl_3$ with 0.03% v/v TMS, 400 MHz): δ(ppm) 5.86-5.30 (br), 3.76-2.44 (br), 1.84 (m), 1.58 (s), 1.51 (s), 0.94 (d, J=6.4 Hz), 0.58 (d, J=7.2 Hz). $^{13}$C NMR ($CDCl_3$ with 0.03% v/v TMS, 100 MHz): δ(ppm) 178.37, 132.31, 52.24, 46.89, 38.69, 25.75, 23.91, 23.24, 22.61, 9.72.

P3: dn/dc=0.0670 mL/g. $^1$H NMR ($CDCl_3$ with 0.03% v/v TMS, 400 MHz): δ(ppm) 5.89-5.23 (br), 3.80-2.50 (br), 2.13 (t, J=7.4 Hz), 1.84 (m), 1.68-1.44 (br), 1.25 (s), 0.95 (d, J=6.4 Hz), 0.59 (d, J=6.8 Hz). $^{13}$C NMR ($CDCl_3$ with 0.03% v/v TMS, 100 MHz): δ(ppm) 178.32, 173.00, 131.96, 41.78, 38.73, 37.01, 29.86-29.14, 27.82, 27.08, 25.96, 25.75, 23.93, 23.15, 22.56, 9.56. Typical NMR spectra of P3 are offered in our previous report.[1]

S1.4.2. Block Copolymerization of M3 and NBPBzMA Via Sequential ROMP

Three different amounts of M3 (200 mg/150 mg/100 mg, corresponding to 0.164 mmol/0.120 mmol/0.0821 mmol) were dissolved in THF (0.21 mL/0.16 mL/0.10 mL) in 10 mL vials, and then the solutions were stirred. Three volumes of 0.01 M Ru in THF (0.330 μmol/0.250 μmol/0.160 μmol of Ru) were rapidly added via syringe to the three monomer solutions in sequence to allow homopolymerization. After the complete conversion of M3, three volumes of 0.1 M NBPBzMA in THF (100 mg/150 mg/200 mg, corresponding to 0.0184 mmol/0.0276 mmol/0.0368 mmol of NBPBzMA) were subsequently added via syringe to the three reaction mixtures in sequence to allow block copolymerization. When precipitation occurred, THF was added to the reaction mixtures to re-dissolve the precipitates. After stirring for 24 h, the polymerization was quenched by adding 2 droplets of ethyl vinyl ether. The resulting polymers were isolated by precipitation in methanol, filtration, and drying under vacuum. A small amount of residual NBPBzMA macromonomers in BCP with $f_{wt,P3}$ of 34% (entry 33 in Table 3) was eliminated by fractional precipitation in acetonitrile/ methanol (1/1 v/v). P3-b-P(NB-g-BzMA): do/dc=0.0847 mL/g for $f_A$=67 wt % (entry 31 in Table 3), 0.105 mL/g for $f_A$=50 wt % (entry 32 in Table 3) and 0.124 mL/g for $f_A$=34 wt % (entry 33 in Table 3). $^1$H NMR (CDCl$_3$ with 0.03% v/v TMS, 400 MHz): δ(ppm) 7.37-7.00 (br), 5.87-5.36 (br), 3.78-2.50 (br), 2.13 (t, J=7.4 Hz), 1.84 (m), 2.00-0.40 (br). $^{13}$C NMR (CDCl$_3$ with 0.03% v/v TMS, 100 MHz): δ(ppm) 177.16, 173.06, 135.34, 131.89, 128.47, 66.87, 54.21 45.01, 41.80, 37.05, 29.61, 27.88, 27.07, 26.01, 25.80, 23.97, 23.17, 22.56, 18.52, 16.59, 9.57. Typical NMR spectra of P3-b-P(NB-g-BzMA)s with $f_A$=67, 50 and 34 wt % are offered in our previous report.[1]

S1.5. Preparation of Self-Assembled P3-b-P(NB-g-BzMA) Thin Films for TEM Analysis P3-b-P(NB-g-BzMA) solutions in THF (2.5 mg/mL for $f_A$=67 and 50 wt %; 5.0 mg/mL for $f_A$=34 wt %) were drop-cast on carbon-coated copper grids, and the samples were placed in a closed chamber containing THF (10 mL) for solvent-vapor annealing at 25° C. The annealing times were 24 h for $f_A$=67 wt %, 12 h for $f_A$=50 wt % and 1 h for $f_A$=34 wt %. The self-assembled P3-b-P(NB-g-BzMA) thin films were dried at room temperature for 24 h, then directly used for TEM analysis without staining

S2. Characterization of Synthetic Compounds

TABLE S1

Results of EA for M1-3

| M | Chemical formula | Observed (calculated) proportion of element except for Si$_8$O$_{12}$ (wt %) | | | |
|---|---|---|---|---|---|
| | | C | H | N | O |
| M1 | C$_{40}$H$_{77}$NO$_{14}$Si$_8$ | 47.2 (47.1) | 7.8 (7.6) | 1.5 (1.4) | 3.3 (3.1) |
| M2 | C$_{42}$H$_{82}$N$_2$O$_{14}$Si$_8$ | 47.2 (47.4) | 7.9 (7.8) | 2.6 (2.6) | 3.0 (3.0) |
| M3 | C$_{52}$H$_{100}$N$_2$O$_{15}$Si$_8$ | 50.9 (51.3) | 7.8 (8.3) | 2.5 (2.3) | 3.8 (3.9) |

[a]The elements of Si$_8$O$_{12}$ nanocage were not detected in EA due to its conversion to silica at combustion temperatures.

S3. Details of Kinetic Analysis for ROMP of M1-3 ([M]$_0$=0.1 M)

TABLE S2

ROMP of M1 initiated by Ru (I) in THF at 25° C. ([M1]$_0$ = 0.1M)

| Entry | [M1]$_0$/[I]$_0$ | t[a] (s) | Conv[b] (%) | M$_{n,\,theo}$[c] (kDa) | M$_n$[b] (kDa) | Đ[b] | M$_{n,\,theo}$/M$_n$ | ln([M1]$_0$/[M1]$_t$) |
|---|---|---|---|---|---|---|---|---|
| S1 | 50 | 15 | 40.0 | 20 | 22 | 1.06 | 0.909 | 0.510 |
| S2 | 50 | 30 | 58.9 | 30 | 32 | 1.03 | 0.938 | 0.889 |
| S3 | 50 | 60 | 84.1 | 43 | 46 | 1.03 | 0.929 | 1.84 |
| S4 | 50 | 120 | 97.8 | 50 | 54 | 1.03 | 0.922 | 3.82 |
| S5 | 50 | 240 | 100 | 51 | 55 | 1.02 | 0.927 | — |
| S6 | 100 | 15 | 32.0 | 33 | 38 | 1.05 | 0.868 | 0.386 |
| S7 | 100 | 30 | 50.5 | 52 | 57 | 1.01 | 0.912 | 0.703 |
| S8 | 100 | 60 | 76.0 | 78 | 86 | 1.01 | 0.907 | 1.43 |
| S9 | 100 | 120 | 92.1 | 94 | 108 | 1.01 | 0.870 | 2.67 |
| S10 | 100 | 240 | 99.1 | 101 | 115 | 1.01 | 0.878 | 4.71 |
| S11 | 100 | 480 | 100 | 102 | 118 | 1.01 | 0.864 | — |
| S12 | 250 | 15 | 18.0 | 46 | 65 | 1.01 | 0.708 | 0.198 |
| S13 | 250 | 30 | 38.1 | 97 | 125 | 1.01 | 0.776 | 0.480 |
| S14 | 250 | 60 | 62.2 | 159 | 199 | 1.01 | 0.799 | 0.973 |
| S15 | 250 | 120 | 85.1 | 217 | 280 | 1.01 | 0.775 | 1.90 |
| S16 | 250 | 240 | 96.6 | 247 | 312 | 1.01 | 0.792 | 3.38 |
| S17 | 250 | 480 | 100 | 255 | 324 | 1.01 | 0.787 | — |
| S18 | 500 | 15 | 13.8 | 70 | 106 | 1.02 | 0.660 | 0.182 |
| S19 | 500 | 30 | 30.3 | 155 | 208 | 1.02 | 0.745 | 0.361 |
| S20 | 500 | 60 | 51.6 | 263 | 343 | 1.02 | 0.767 | 0.726 |
| S21 | 500 | 120 | 77.6 | 396 | 495 | 1.02 | 0.800 | 1.50 |
| S22 | 500 | 240 | 93.7 | 478 | 605 | 1.03 | 0.790 | 2.76 |
| S23 | 500 | 480 | 98.8 | 504 | 626 | 1.04 | 0.805 | 4.42 |
| S24 | 500 | 960 | 100 | 510 | 634 | 1.04 | 0.804 | — |
| S25 | 1000 | 15 | 13.6 | 139 | 181 | 1.06 | 0.768 | 0.146 |
| S26 | 1000 | 30 | 27.8 | 284 | 333 | 1.02 | 0.853 | 0.326 |
| S27 | 1000 | 60 | 49.0 | 500 | 543 | 1.03 | 0.921 | 0.673 |
| S28 | 1000 | 120 | 71.8 | 733 | 797 | 1.03 | 0.920 | 1.27 |
| S29 | 1000 | 249 | 87.2 | 890 | 972 | 1.04 | 0.916 | 2.06 |
| S30 | 1000 | 480 | 96.2 | 982 | 1078 | 1.05 | 0.913 | 3.27 |
| S31 | 1000 | 969 | 100 | 1020 | 1138 | 1.06 | 0.896 | — |

[a]t: Polymerization time.
[b]Determined by SEC-MALLS.
[c]M$_{n,\,theo}$ = [M1]$_0$/[I]$_0$ × conv/100% × MW of M1.

TABLE S3

ROMP of M2 initiated by Ru (I) in THF at 25° C. ([M2]$_0$ = 0.1M)

| Entry | [M2]$_0$/[I]$_0$ | t$^a$ (s) | Conv$^b$ (%) | M$_{n, theo}$$^c$ (kDa) | M$_n$$^b$ (kDa) | Đ$^b$ | M$_{n, theo}$/M$_n$ | ln([M2]$_0$/[M2]$_t$) |
|---|---|---|---|---|---|---|---|---|
| S32 | 50 | 120 | 23.3 | 12 | 16 | 1.07 | 0.750 | 0.265 |
| S33 | 50 | 240 | 38.2 | 20 | 26 | 1.03 | 0.769 | 0.481 |
| S34 | 50 | 480 | 59.2 | 31 | 40 | 1.03 | 0.775 | 0.896 |
| S35 | 50 | 960 | 82.7 | 44 | 56 | 1.04 | 0.786 | 1.75 |
| S36 | 50 | 1920 | 97.1 | 52 | 67 | 1.04 | 0.776 | 3.54 |
| S37 | 50 | 3840 | 100 | 53 | 71 | 1.04 | 0.746 | — |
| S38 | 100 | 240 | 23.7 | 25 | 30 | 1.03 | 0.833 | 0.271 |
| S39 | 100 | 480 | 39.4 | 42 | 49 | 1.03 | 0.857 | 0.501 |
| S40 | 100 | 960 | 62.2 | 66 | 80 | 1.02 | 0.825 | 0.973 |
| S41 | 100 | 1920 | 86.3 | 92 | 112 | 1.04 | 0.821 | 1.99 |
| S42 | 100 | 3840 | 98.1 | 104 | 126 | 1.05 | 0.825 | 3.96 |
| S43 | 100 | 7680 | 100 | 106 | 132 | 1.06 | 0.803 | — |
| S44 | 250 | 480 | 18.9 | 50 | 55 | 1.03 | 0.909 | 0.207 |
| S45 | 250 | 960 | 32.5 | 85 | 96 | 1.02 | 0.885 | 0.387 |
| S46 | 250 | 1920 | 54.5 | 143 | 166 | 1.03 | 0.861 | 0.772 |
| S47 | 250 | 3840 | 84.1 | 221 | 262 | 1.05 | 0.844 | 1.78 |
| S48 | 250 | 7680 | 96.9 | 258 | 312 | 1.10 | 0.827 | 3.47 |
| S49 | 500 | 960 | 24.7 | 131 | 130 | 1.04 | 1.01 | 0.284 |
| S50 | 500 | 1920 | 42.8 | 228 | 218 | 1.06 | 1.04 | 0.559 |
| S51 | 500 | 3840 | 68.7 | 365 | 345 | 1.11 | 1.06 | 1.16 |
| S52 | 500 | 7680 | 86.0 | 457 | 502 | 1.14 | 0.910 | 1.97 |
| S53 | 1000 | 1920 | 24.9 | 265 | 270 | 1.04 | 0.981 | 0.286 |
| S54 | 1000 | 3840 | 38.6 | 410 | 436 | 1.05 | 0.940 | 0.488 |
| S55 | 1000 | 7680 | 62.6 | 666 | 736 | 1.13 | 0.904 | 0.984 |

$^a$t: Polymerization time.
$^b$Determined by SEC-MALLS.
$^c$M$_{n, theo}$ = [M2]$_0$/[I]$_0$ × conv/100% × MW of M2.

TABLE S4

ROMP of M3 initiated by Ru (I) in THF at 25° C. ([M3]$_0$ = 0.1M)

| Entry | [M3]$_0$/[I]$_0$ | t$^a$ (s) | conv$^b$ (%) | M$_{n, theo}$$^c$ (kDa) | M$_n$$^b$ (kDa) | Đ$^b$ | M$_{n, theo}$/M$_n$ | ln([M3]$_0$/[M3]$_t$) |
|---|---|---|---|---|---|---|---|---|
| S56 | 50 | 15 | 45.5 | 28 | 30 | 1.04 | 0.933 | 0.607 |
| S57 | 50 | 30 | 70.4 | 43 | 47 | 1.04 | 0.915 | 1.22 |
| S58 | 50 | 60 | 91.4 | 56 | 62 | 1.02 | 0.903 | 2.45 |
| S59 | 50 | 120 | 99.3 | 60 | 68 | 1.02 | 0.882 | 4.96 |
| S60 | 50 | 240 | 100 | 61 | 69 | 1.01 | 0.844 | — |
| S61 | 100 | 15 | 42.6 | 52 | 58 | 1.02 | 0.897 | 0.555 |
| S62 | 100 | 30 | 68.4 | 83 | 90 | 1.01 | 0.922 | 1.15 |
| S63 | 100 | 60 | 89.3 | 109 | 115 | 1.01 | 0.948 | 2.23 |
| S64 | 100 | 120 | 98.8 | 120 | 127 | 1.01 | 0.945 | 4.42 |
| S65 | 100 | 240 | 100 | 122 | 125 | 1.01 | 0.976 | — |
| S66 | 250 | 15 | 34.9 | 106 | 118 | 1.03 | 0.898 | 0.429 |
| S67 | 250 | 30 | 60.5 | 184 | 192 | 1.02 | 0.958 | 0.929 |
| S68 | 250 | 60 | 86.2 | 262 | 259 | 1.02 | 1.01 | 1.98 |
| S69 | 250 | 120 | 97.9 | 298 | 295 | 1.04 | 1.01 | 3.77 |
| S70 | 250 | 240 | 100 | 305 | 302 | 1.05 | 1.01 | — |
| S71 | 500 | 15 | 29.5 | 180 | 202 | 1.01 | 0.892 | 0.349 |
| S72 | 500 | 30 | 54.1 | 329 | 337 | 1.03 | 0.876 | 0.779 |
| S73 | 500 | 60 | 78.6 | 479 | 459 | 1.04 | 1.04 | 1.54 |
| S74 | 500 | 120 | 95.3 | 580 | 544 | 1.06 | 1.07 | 3.06 |
| S75 | 500 | 240 | 100 | 609 | 570 | 1.08 | 1.06 | — |
| S76 | 1000 | 15 | 20.9 | 255 | 289 | 1.03 | 0.882 | 0.234 |
| S77 | 1000 | 30 | 41.9 | 510 | 517 | 1.05 | 0.986 | 0.543 |
| S78 | 1000 | 60 | 67.9 | 827 | 739 | 1.08 | 1.25 | 1.14 |
| S79 | 1000 | 120 | 89.5 | 1090 | 854 | 1.13 | 1.27 | 2.41 |
| S80 | 1000 | 240 | 98.9 | 1205 | 902 | 1.14 | 1.34 | 4.51 |
| S81 | 1000 | 480 | 100 | 1218 | 910 | 1.15 | 1.34 | — |

$^a$t: Polymerization time.
$^b$Determined by SEC-MALLS.
$^c$M$_{n, theo}$ = [M3]$_0$/[I]$_0$ × conv/100% × MW of M3.

S4. Physical Properties of P1-3 s

Table S5

$R_{g,z}$ values for P1-3s in 3.5 mg/mL THF solutions

| Entry | $M_w{}^a$ (kDa) | $DP_w$ | $logDP_w$ | $R_{g,z}{}^a$ (nm) | $log(R_{g,z}/nm)$ |
|---|---|---|---|---|---|
| P1 | | | | | |
| 17 | 109 | 107 | 2.03 | 13.2 | 1.12 |
| 18 | 278 | 272 | 2.43 | 21.7 | 1.34 |
| 19 | 545 | 534 | 2.73 | 29.4 | 1.47 |
| 20 | 1145 | 1122 | 3.05 | 38.2 | 1.58 |
| P2 | | | | | |
| 7 | 140 | 132 | 2.12 | 14.1 | 1.15 |
| 8 | 342 | 321 | 2.51 | 21.9 | 1.34 |
| 9 | 572 | 538 | 2.73 | 27.6 | 1.44 |
| 10 | 834 | 784 | 2.89 | 34.2 | 1.53 |
| P3 | | | | | |
| 27 | 126 | 103 | 2.01 | 9.7 | 0.987 |
| 28 | 335 | 275 | 2.44 | 16.4 | 1.21 |
| 29 | 701 | 576 | 2.76 | 28.2 | 1.45 |
| 30 | 1481 | 1216 | 3.08 | 52.7 | 1.72 |

$^a$Determined from SEC-MALLS.

Results and Discussion on TGA Analysis.

The thermal degradation behaviors of P1 ($M_n$=1042 kDa; Đ=1.10), P2 ($M_n$=736 kDa; Đ=1.13) and P3 ($M_n$=1236 kDa; Đ=1.20) were examined by TGA at a heating rate of 10° C./min under a nitrogen atmosphere (FIG. S12). According to a previous study on the thermal degradation of POSS, the weight loss of octaalkyl-substituted POSSs occurs by evaporation at temperatures above their melting points. In particular, the weight loss of octaisobutyl POSS generally begins at approximately 200° C.$^{s2}$ However, POSS molecules bound to the polymer chain must be evaporated after Si—C bond cleavage. In the TGA thermograms of P1-3, the degradation temperatures at the initial 5 wt % loss ($T_{d,5\ wt\ \%}$) were observed to be 431° C. for P1, 385° C. for P2, and 419° C. for P3, which correspond the temperatures for Si—C bond cleavage. The lowest thermal stability of P2 indicated the catalytic effect of the secondary amine on the Si—C bond cleavage. The thermal stability of P3, which has fewer catalytic amide groups, is between the stabilities of P1 and P2. The residual weights (16% for P1, 6% for P2, and 4% for P3) even after heating to 800° C. resulted from the conversion of POSS residues to amorphous silica.$^{s2}$

S5. Additional TEM Micrographs of P3-b-P(NB-g-BzMA)

While the present invention has been described in connection with what is presently considered to be practical exemplary embodiments, it is to be understood that the invention is not limited to the disclosed embodiments, but, on the contrary, it will be understood by those skilled in the art that the present invention may be embodied in other specific forms without departing from the spirit or essential characteristics thereof. It is therefore to be understood that the embodiments described above are illustrative in all aspects and not restrictive.

The invention claimed is:

1. A macromolecular photonic crystal material including an A block and a B block, wherein the A block comprises a crystalline polyhedral oligomeric POSS, and the macromolecular photonic crystal material represented by the structural formula 1:

[Formula 1]

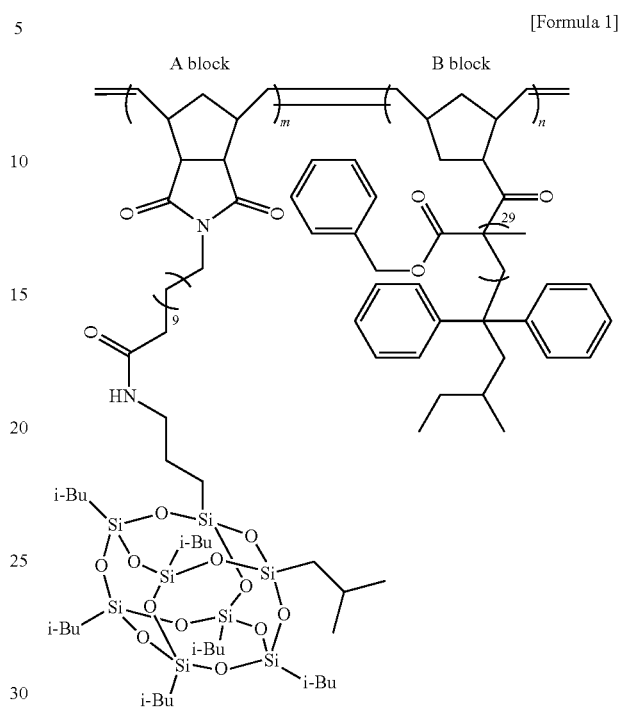

where, in formula 1, each of m and n is an independent integer.

2. A macromolecular photonic crystal material including an A block and a B block, wherein:
the A block is derived from a monomer represented by Formula A, and
the B block is derived from a monomer represented by Formula B,

[Formula A]

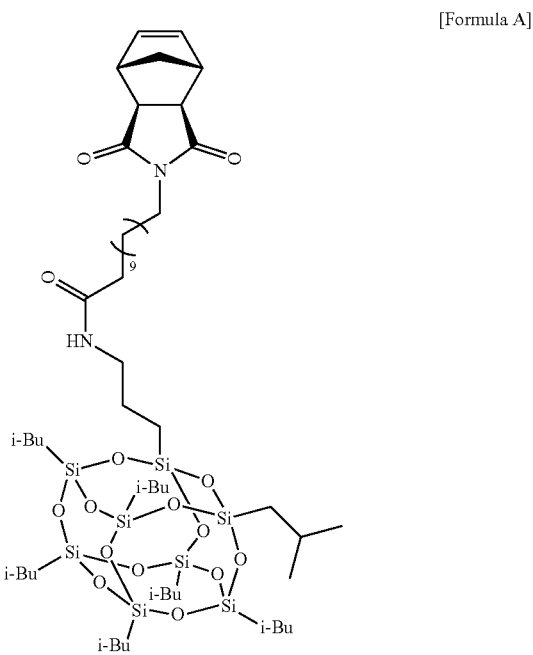

-continued
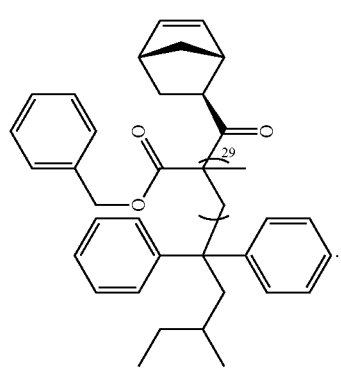
[Formula B]
* * * * *